United States Patent
Erbey et al.

(10) Patent No.: US 8,838,491 B2
(45) Date of Patent: *Sep. 16, 2014

(54) METHOD AND SYSTEM FOR AN INTEGRATED APPROACH TO COLLECTIONS CYCLE OPTIMIZATION

(71) Applicant: Altisource Solutions S.à r.l., Luxembourg (LU)

(72) Inventors: William C. Erbey, Frederiksted, VI (US); Ronald M. Faris, West Palm Beach, FL (US); Ashish Pandey, Frederiksted, VI (US); Amanjeet Saluja, Bangalore (IN); Deepak Dhayanithy, Bangalore (IN); Saurav Chawla, Bangalore (IN); Seth Evans Carter, Winston-Salem, NC (US)

(73) Assignee: Altisource Solutions S.à r.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 13/923,601

(22) Filed: Jun. 21, 2013

(65) Prior Publication Data

US 2013/0346131 A1 Dec. 26, 2013

Related U.S. Application Data

(63) Continuation of application No. 12/731,888, filed on Mar. 25, 2010, now Pat. No. 8,473,391, which is a continuation of application No. 12/651,020, filed on Dec. 31, 2009, now abandoned.

(51) Int. Cl.
*G06Q 40/00* (2012.01)
*G06Q 40/02* (2012.01)
*G06Q 10/06* (2012.01)
*G06Q 10/04* (2012.01)
*G08B 25/08* (2006.01)
*G06Q 20/10* (2012.01)

(52) U.S. Cl.
CPC .............. *G06Q 40/025* (2013.01); *G08B 25/08* (2013.01); *G06Q 40/00* (2013.01); *G06Q 10/06398* (2013.01); *G06Q 10/04* (2013.01); *G06Q 40/02* (2013.01); *G06Q 20/102* (2013.01)
USPC .................... 705/35; 705/38; 705/39; 705/40

(58) Field of Classification Search
CPC ..... G06Q 40/00; G06Q 40/02; G06Q 20/102; G08B 25/08
USPC ......................................... 705/35, 38, 39, 40
See application file for complete search history.

(56) References Cited

U.S. PATENT DOCUMENTS

| | | |
|---|---|---|
| 4,797,911 A | 1/1989 | Szlam et al. |
| 5,594,638 A | 1/1997 | Iliff |

(Continued)

OTHER PUBLICATIONS

Owen, J. (Mar. 2007). Animal instincts . . . can improve collections results. Credit Management, 20-21. Retrieved Jun. 9, 2014.*

(Continued)

*Primary Examiner* — Kito R Robinson

(57) ABSTRACT

Methods and systems are provided for an integrated approach to collections cycle optimization including optimizing personnel, communications, and collection resolutions, resulting in reducing the variability of the collections cycle, reducing instances of foreclosure in collections, while increasing borrower satisfaction with the collections process. Candidate loan officers are selected based on behavioral attributes, personnel history, and human resources information, among other factors. Scripts that improve the effectiveness of communication between loan collection staff and borrowers are generated. An optimized collection program to best suit the needs of a particular borrower is determined.

20 Claims, 36 Drawing Sheets

(56) References Cited

U.S. PATENT DOCUMENTS

| | | | |
|---|---|---|---|
| 5,737,726 | A | 4/1998 | Cameron et al. |
| 5,887,253 | A | 3/1999 | O'Neil et al. |
| 5,889,799 | A | 3/1999 | Grossman et al. |
| 5,960,073 | A | 9/1999 | Kikinis et al. |
| 6,098,052 | A | 8/2000 | Kosiba et al. |
| 6,195,426 | B1 | 2/2001 | Bolduc et al. |
| 6,453,299 | B1 | 9/2002 | Wendkos |
| 6,574,605 | B1 | 6/2003 | Sanders et al. |
| 6,587,556 | B1 | 7/2003 | Judkins et al. |
| 6,603,852 | B2 | 8/2003 | Saito et al. |
| 6,639,982 | B1 | 10/2003 | Stuart et al. |
| 6,763,104 | B1 | 7/2004 | Judkins et al. |
| 6,782,091 | B1 | 8/2004 | Dunning |
| 6,798,876 | B1 | 9/2004 | Bala |
| 6,819,759 | B1 | 11/2004 | Khuc et al. |
| 6,912,272 | B2 | 6/2005 | Kirk et al. |
| 7,103,562 | B2 | 9/2006 | Kosiba et al. |
| 7,158,628 | B2 | 1/2007 | Mcconnell et al. |
| 7,191,150 | B1 * | 3/2007 | Shao et al. ............ 705/38 |
| 7,203,285 | B2 | 4/2007 | Blair |
| 7,386,467 | B2 | 6/2008 | Eitel et al. |
| 7,472,089 | B2 | 12/2008 | Hu et al. |
| 7,546,262 | B1 * | 6/2009 | Ferguson et al. ............ 705/35 |
| 7,558,756 | B1 | 7/2009 | Wesly et al. |
| 7,680,728 | B2 | 3/2010 | Lazerson |
| 8,117,117 | B2 | 2/2012 | Hu et al. |
| 8,458,074 | B2 | 6/2013 | Showalter |
| 8,489,498 | B1 | 7/2013 | Flaxman et al. |
| 8,521,631 | B2 | 8/2013 | Abrahams et al. |
| 8,595,130 | B2 | 11/2013 | Johnson et al. |
| 8,600,876 | B2 | 12/2013 | Smith et al. |
| 8,620,725 | B2 * | 12/2013 | Neuweg et al. ............ 705/7.38 |
| 2001/0040892 | A1 | 11/2001 | Spencer |
| 2001/0054064 | A1 | 12/2001 | Kannan |
| 2002/0009190 | A1 | 1/2002 | Mcillwaine et al. |
| 2002/0022986 | A1 | 2/2002 | Coker et al. |
| 2002/0152288 | A1 | 10/2002 | Hora et al. |
| 2003/0078881 | A1 * | 4/2003 | Elliott et al. ............ 705/39 |
| 2003/0086557 | A1 | 5/2003 | Shambaugh et al. |
| 2003/0179877 | A1 | 9/2003 | Dezonno et al. |
| 2003/0190021 | A1 | 10/2003 | Hornsby |
| 2004/0015425 | A1 * | 1/2004 | O'Neill ............ 705/35 |
| 2004/0042611 | A1 | 3/2004 | Power et al. |
| 2004/0042612 | A1 | 3/2004 | Michelson et al. |
| 2004/0059596 | A1 * | 3/2004 | Vaidyanathan et al. ......... 705/1 |
| 2004/0062364 | A1 | 4/2004 | Dezonno et al. |
| 2004/0109557 | A1 | 6/2004 | Lenard |
| 2004/0162773 | A1 | 8/2004 | Del Rey et al. |
| 2004/0234065 | A1 | 11/2004 | Anderson |
| 2005/0053224 | A1 | 3/2005 | Pennington et al. |
| 2005/0149418 | A1 | 7/2005 | Erbey et al. |
| 2005/0160142 | A1 | 7/2005 | Whitman |
| 2005/0195961 | A1 | 9/2005 | Pasquale et al. |
| 2006/0062376 | A1 | 3/2006 | Pickford |
| 2006/0095273 | A1 | 5/2006 | Montvay et al. |
| 2006/0179011 | A1 * | 8/2006 | Latz ............ 705/80 |
| 2006/0287949 | A1 * | 12/2006 | Silverman ............ 705/39 |
| 2007/0043661 | A1 * | 2/2007 | Kass et al. ............ 705/38 |
| 2009/0132365 | A1 | 5/2009 | Gruenhagen et al. |
| 2009/0171668 | A1 | 7/2009 | Sneyders et al. |
| 2010/0324966 | A1 | 12/2010 | Neuweg et al. |
| 2011/0150206 | A1 | 6/2011 | Pickford |
| 2011/0208660 | A1 | 8/2011 | Erbey et al. |
| 2012/0317038 | A1 | 12/2012 | Erbey et al. |

OTHER PUBLICATIONS

"Call Center Demos," Database Systems Corp. Call Center Technology, http://www.databasesystemscorp.com/demonstrations.htm (Jan. 2005).

"Knowledge Center: Product Papers: Mortgage Industry," http://www.extservice.com/Knowledge Center.htm.

"New Century Mortgage Combines Contact Center Solutions for Maximized Performance," http://www.contactcenterworld.com/news.asp?request=1&NewsItemID=(5F104E03 . . (Jul. 2, 2004).

Bob Gdovic "Calling All Customers" Bank Marketing. Washington: May 2001. vol. 33, Issue 4; p. 32, 5 pgs.

Final Office Action, dated Jan. 4, 2006, from corresponding U.S. Appl. No. 10/918,699.

Final Office Action, dated Nov. 16, 2007, from corresponding U.S. Appl. No. 10/918,699.

Final Office Action, dated Oct. 4, 2006, from corresponding U.S. Appl. No. 10/918,699.

James Swann, "Making the connection: How techonology integrates call centers," Community Banker. Washington: Jul. 2003. vol. 12, Issue 7; p. 34 [ISSN/ISBN: 15291332 and ProQuest document ID: 370884771].

Maria Bruno "Buying Q-Up Puts S1 Tops in NT Systems with its latest buy, S1 Corp. is setting its sights on the small bank market," Bank Technology News. New York: May 8, 2000. vol. 14, Issue 5; p. 33.

Merly Davids "How to avoid the 10 biggest mistakes in CRM"; The Journal of Business Strategy. Boston: Nov./Dec. 1999. vol. 20, Issue 6; p. 22, 5 pgs.

Office Action, dated Apr. 21, 2006, from corresponding U.S. Appl. No. 10/918,699.

Office Action, dated Aug. 19, 2005, from corresponding U.S. Appl. No. 10/918,699.

Office Action, dated Aug. 25, 2010, from corresponding U.S. Appl. No. 10/918,699.

Office Action, dated Jun. 25, 2007, from corresponding U.S. Appl. No. 10/918,699.

PCT International Search Report, dated Jul. 17, 2012, from corresponding PCT Application Serial No. PCT/US2012/33089.

Prabhaker, Paul R.; Sheehan, Michael J.; Coppett, John I. The Power of Technology in Business Selling: Call Centers, The Journal of Business & Industrial Marketing. Santa Barbera: 1997. vol. 12, Issue 3/4; p. 222.

Related Case—U.S. Appl. No. 13/035,859, filed Feb. 25, 2011, entitled "Methods and Systems for Providing Customer Relations Information," now Publication No. 20110208660.

Related Case—U.S. Appl. No. 13/443,618, filed Apr. 10, 2012, entitled "System and Methods for Optimizing Customer Communications."

Simpson, B. (2001). A not-so-simple labor market. Credit Card Management, 14(8), 52-60. Retrieved Mar. 29, 2013.

Trevor Thomas "CRM systems help analyze workflow, profile customers," National Underwriter. (Life, health/financial services ed.). Erlanger: Oct. 21, 2002. vol. 106, Issue 42; p. 11, 2pgs.

Written Opinion of the International Searching Authority, dated Jul. 17, 2012, from corresponding PCT Application Serial No. PCT/US/2012/33089.

Office Action, dated Sep. 12, 2013, from corresponding U.S. Appl. No. 13/443,618.

Office Action, dated Sep. 24, 2013, from corresponding U.S. Appl. No. 13/035,859.

Notice of Allowance, dated Feb. 27, 2014, from corresponding U.S. Appl. No. 13/035,859.

Final Office Action, dated Apr. 11, 2014, from corresponding U.S. Appl. No. 13/443,618.

* cited by examiner

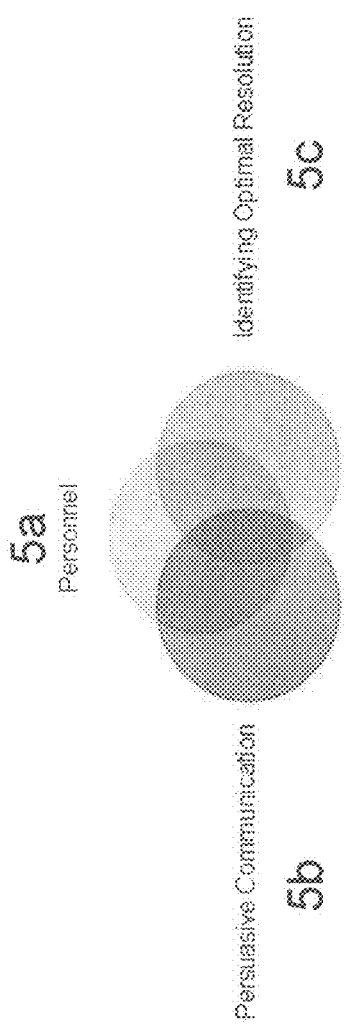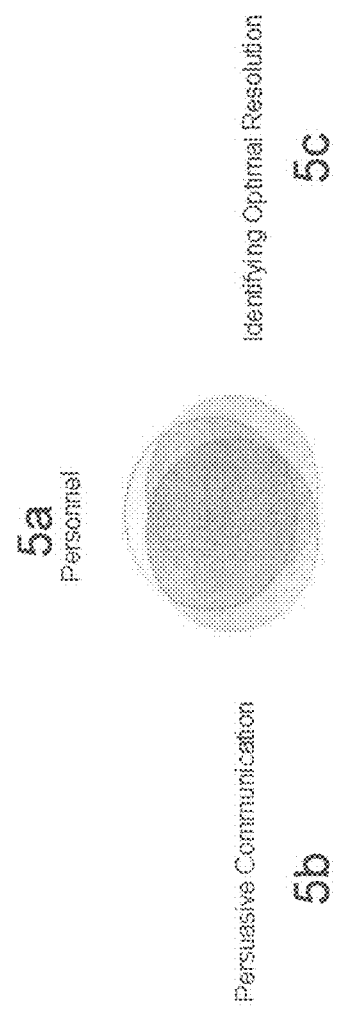

(Collector Effectiveness) is predicted by [$/hour (3 mth. ave.)] and [% of Goal (3 mth. ave.)]

560

[$/hour (3 mth. ave.)] per collector can be represented through the following formulas:

$$\frac{\$ \text{ Collected}}{\text{Number of Payed Hours}} = \text{Reach} \times \text{Conversion} \times \text{Yield}$$

$$\text{Reach} = \frac{\text{Cumulative Right Party Contacts}}{\text{Number of Payed Hours}}$$

$$\text{Conversion} = \frac{\text{Promises to Pay Kept or Number of Payments}}{\text{Cumulative Right Party Contacts}}$$

$$\text{Yield} = \frac{\$ \text{ Collected}}{\text{Promises to Pay Kept or Number of Payments}}$$

[% of Goal (3 mth. ave.)] represents the ratio of each collector's actual $ in fees collected vs. the monthly goal.

FIG.4B

An example of how scripts incorporate specific behavioral science principles:

Social Proof

"...this year alone our programs have helped over 40,000 homeowners in similar situations to yours to save their homes from foreclosure."

Use of Incentive

"Make the first payment of the new plan on time, and the modified loan rate is locked in. As an added bonus, at that time, we will also begin reporting your payment status as current to credit reporting agencies, which could help you begin repairing your credit rating."

FIG. 6

| Sr. No. | Monthly Cash Flow Item | Cash Outflows | Description |
|---|---|---|---|
| 1 | Foreclosure fees | | Fees associated with foreclosure |
| 2 | Foreclosure costs | | Monthly costs associated with foreclosure |
| 3 | Repair costs | | Expected repair costs of property before marketing |
| 4 | Maintenance costs | | Costs of maintaining property while marketing it |
| 5 | Utilities costs | | Utilities costs of property while marketing it |
| 6 | Broker fees | | Expected broker fees |
| 7 | Closing costs | | Closing costs at end of marketing period in foreclosure |
| 8 | Taxes | | Monthly taxes paid out on behalf of borrower |
| 9 | Insurance (Escrowed and Non Escrowed) | | Monthly insurance paid out on behalf of borrower |
| 10 | Token payment to 2$^{nd}$ liens | | In case of sale option, token amount to be paid to 2$^{nd}$ lien to extinguish its rights on the property |
| 11 | Cash for keys | | Cash to be paid to borrower to vacate the property sooner in case of sale option or DIL option |
| 12 | DIL additional Legal fees | | Legal fees in transferring rights from borrower to servicer (on behalf of investor) |
| 13 | Home Owners Association (HOA fees) | | Monthly fees to be paid to HOA |

FIG. 8B

| Sr. No. | Monthly Cash Flow Item | Cash Inflows | Description |
|---|---|---|---|
| 14 | Property sale proceeds | | Value of property at time of liquidation. Value is adjusted across months using predicted HPI values |
| 15 | Short sale offer | | Property offer available to borrower (which is less than the total outstanding balance against borrower) |
| 16 | Down payment | | Amount to be paid upfront by the borrower at the time of resolution |
| 17 | Monthly Principal and Interest payment | | Monthly payment to be received from borrower post resolution |
| 18 | Arrears –repayment | | In forbearance, additional payment to be received for recovery of arrears on monthly basis for 12 months |
| 19 | Token Amount received by the 2$^{nd}$ lien as an external offer | | If the first lien is serviced by someone else, the 2$^{nd}$ lien might receive a token amount to relinquish its hold on the property |

FIG. 8C

| Input Category |
|---|
| Borrower Financials and other details pertaining to current situation |
| Borrower Existing Plan Details |
| Borrower Credit History |
| Borrowers' Income Growth Projection |
| Borrower Probability of Default / Prepayment Post Restructuring |
| HPI values |
| Property Details |
| Investor Constraints |
| Under-writer Constraints |
| Key Assumptions |
| Foreclosure Associated Costs and Timelines |

FIG. 9B

| Sr No. | Resolution Option | Description |
|---|---|---|
| 1 | Step Modification | • Interest reduced for a specified period<br>• Interest stepped up after period depending on the income growth of the borrower |
| 2 | Straight Modification | • Interest reduced for remaining term of loan |
| 3 | Discount Modification | • Principal knocked off from unpaid balance of loan |
| 4 | Balloon Modification | • Term increased for monthly payment calculation purposes. Lump sum payment "ballooned" at end of original term |
| 5 | Discount Step Modification | • Principal knocked off from unpaid balance of loan. Further interest rate reduced for a pre-specified period ,post step interest calculated using income growth of the borrower |
| 6 | Balloon Step Modification | • Term increased for monthly payment calculation purposes. Further, interest rate reduced for a pre-specified period ,post step interest calculated using income growth of the borrower Lump sum payment "ballooned" at end of original term |
| 7 | Forbearance | • Given enough affordability, past arrears converted into monthly installments for next 12 months, in addition to existing plan associated payments |
| 8 | Foreclosure | • Property acquired from borrower for marketing |
| 9 | Deed in Lieu | • Borrower hands over the deed of property to servicer to avoid foreclosure |
| 10 | Short Sale | • Borrower has an offer for the property which is lower than what borrower owes as loan. |

FIG. 10B

| Variable | Description |
|---|---|
| Re-default Models | |
| Mod Age | With every additional month of Mod age (up until the Mod age of 3 months), the probability of Redefault increases |
| # Payments made / # Scheduled Payments | Higher # payments made by borrower (as a ratio to scheduled payment till date) implies borrower will have lower chance of redefault |
| (Old PI pmt - New PI Pmt)/Old PI pmt | Larger the % discount in monthly payment achieved through the Mod plan, lower is the probability of Redefault |
| (CLTV at MOD - CLTV at ORIG)/CLTV ORIG | Higher increase in CLTV since origination results in higher chance of redefault |
| FICO at the time of MOD | Higher the FICO score at the time of Mod, the lower is the Redefault probability |
| Is the property non-owner occupied ?(1 signifies Yes) | If the property is non-owner occupied, the probability of Redefault is higher |
| Is there a co - borrower on the loan?(1 signifies Yes) | If there is a Co-borrower on the Note, the probability of Redefault is lower |
| # Dependents | The higher the number of Dependents for the Borrower, the higher is the probability of Redefault |
| Income growth projection in the current year | The higher the Income growth projection in the current year in the property MSA, the lower is the Redefault probability |
| Has the borrower ever been in FCLS ?(1 signifies Yes) | Loans that have already been in the FCLS before the current Mod have a higher probability of Redefault |
| Loan Age at Mod | The Older the Loan is at the time of the Mod, the lower is the Redefault probability |
| Prepayment Models | |
| Original Loan type is FIXED | Fixed loans have higher chances of prepayment |
| Origination CLTV | Higher the Origination CLTV of the loan, lower the chances of prepayment |
| Number of Days Delinquent at the Time of Resolution | Higher the number of days a loan is delinquent at the time of resolution, lower the chances of prepayment |

FIG. 11B

Microsoft Excel - Loan Resolution Cash Flow Model V84

Housing Expenses

Consultant Screen

| | B | C | D | E | F | G | H |
|---|---|---|---|---|---|---|---|
| | Home Maintenance | $ - | Borrower | Gasoline | $ - | Borrower | Cable TV/Entertainment |
| | HOA | $ - | Borrower | Auto Maintenance | $ 500.00 | Borrower | School Tuition |
| | Other | $ - | Borrower | Child Care | $ - | Borrower | Vacation |
| | Total | $ 500.00 | Derived | Child Support | $ - | Borrower | Allowable Living |
| | | | | Alimony | $ - | Borrower | Other |
| | | | | Other | $ - | | 1st Lien contribution (if serviced by someone other than Ocwen) |
| | | | | Total | $ 500.00 | Derived | 2nd lien contribution (if serviced by someone other than Ocwen) |
| | Monthly tax payments | $ 137.42 | REALS | Monthly tax payments(after manual editing, if any) | | $ 137.42 | |
| | Monthly Insurance payments | $ 217.00 | REALS | Monthly Insurance payments(after manual editing, if any) | | $ 217.00 | Total |
| | Rental Income after taxes | $ 1,954.92 | Borrower | | | | |
| | Total Expenses | $ 3,500.00 | Derived | | | | |
| | Total Net Monthly Income after taxes | $ 1,645.58 | Borrower | | | | |
| | Affordable P&I | | Derived | Affordable P&I after the cushion limit | $ | 1454.94 | |

Key Assumptions

Microsoft Excel - Loan Resolution Cash Flow Model V04
Financialc> 180 days old

| | A | B | C | D | E | F |
|---|---|---|---|---|---|---|
| | | Key Assumptions | | REALS | | |
| | Different investors for 1st and 2nd lien | | ? signifies different investors for the liens | Key Assumptions | | |
| | The next best option below FCLS with an NPV | 0% | This is the sensitivity limit of NPV for specifying the next best option if ADMK,DIL or shortsale come out to be the prioritized feasible options | | | |
| | | Value | Source | Cash flow constraints | Value | Source |
| | Cash Flow Constraints | 36 | Key Assumptions | Earliest Step up period(2nd lien) | 36 | Key Assumptions |
| | Earliest Step up period(1st lien) | 6 | Key Assumptions | Step-up interval(2nd lien) | 6 | Key Assumptions |
| | Step up Interval(1st lien) | 12.00% | Key Assumptions | Minimum Time to maturity for a Step MOD(MONTHS) | 36 | Key Assumptions |
| | Maximum fixed interest rate(1st lien) | 14.00% | Key Assumptions | | | |
| | Maximum Step interest rate(1st lien) | 500.00 | Key Assumptions | | | |
| | Minimum Down payment(1st lien) | 100.00 | Key Assumptions | | | |
| | Minimum Down payment(2nd lien) | 3.00% | Key Assumptions | | | |
| | Minimum Post Step interest rate(1st lien) | 2.00% | Key Assumptions | | | |
| | Minimum Fixed Interest Rate(2nd lien) | 2.00% | Key Assumptions | | | |
| | Minimum Pre Step Interest Rate(1st lien) | 2.00% | Key Assumptions | | | |
| | Minimum Pre Step Interest Rate(2nd lien) | 2.00% | Key Assumptions | | | |
| | Maximum post Step interest rate(2nd lien) | 2.00% | Key Assumptions | | | |

FIG. 13C

Microsoft Excel - Loan Resolution Cash Flow Model V94

A114    Minimum Fixed interest rate (1st lien)

| A | B | C | D | E | F | G |
|---|---|---|---|---|---|---|
| Key Assumptions | | | | | | |
| Months after which cash for keys is offered after initiating shortsale | 2 | Key Assumptions | | | | |
| Minimum Broker Fees | $ 2,500.00 | Key Assumptions | | | | |
| Underwriter Constraints | Value | Action required | Source | Variable | Value | Description |
| Borrower in Active Bankruptcy | N | Do not communicate directly with borrower | REALS | Counter offer Short Sale (in months to vacate the property) | 12 | It is used to fill the Cash for keys matrix in the DIL calculation tab |
| Borrower Crossed 180 day line in bankruptcy | N | if Value="Y" VP approval needed | REALS | Initial Offer Short Sale (in months to vacate the property) | 12 | |
| Loan already foreclosed or currently in eviction | N | Deny MOD | REALS | | 12 | |
| Has the loan already been on a modification plan | N | if Value="Y" Management approval needed | REALS | | | |
| Financials 180 days old | N | | REALS | Counter offer DIL (in months to vacate the property) | 12 | It is used to fill the Cash for keys matrix in the Shortsale calculation tab |
| | | if Value="Y" Management approval needed | REALS | Initial Offer DIL (in months to vacate the property) is | 12 | |

FIG. 13D

Microsoft Excel - Loan Resolution Cash Flow Model V94

A140   /7/ Borrower in Active Bankruptcy

Key Assumptions

| A | B | C | D |
|---|---|---|---|
| Maximum FCLS period | 7 | This field will come from Freddie Mac as a key assumption | Freddie Mac3 |
| Expected Marketing period | 6 | This field will come from the property state parameter table as a key assumption | SPP table |
| Projected Legal Fees Per Period | $ 117.89 | This field will come from the property state parameter table as a key assumption | SPP table |
| Projected Legal Cost Per Period | $ 350.00 | This field will come from the property state parameter table as a key assumption | SPP table |
| Repair Cost | $ 3,150.00 | This field will come from the property state parameter table as a key assumption | SPP table |
| Projected Maintenance Cost per period | $ 125.00 | This field will come from the property state parameter table as a key assumption | SPP table |
| Projected Utilities Cost per period | $ 57.5 | This field will come from the property state parameter table as a key assumption | SPP table |
| Broker Fees | $ 8,450.00 | This field will come from the property state parameter table as a key assumption | SPP table |
| Closing Cost | $ 2,450.00 | This field will come from the property state parameter table as a key assumption | SPP table |
| Monthly Insurance | $ 217.00 | This field will come from the property state parameter table as a key assumption | SPP table |
| Monthly Taxes | $ 137.42 | This field will come from the property state parameter table as a key assumption | SPP table |
| Borrower willing to payoff the 2nd lien | N | It can be Y or N | Borrower Input |
| Monthly HOA Fee | $ 100.00 | This field will come from the property state parameter table as a key assumption | SPP table |
| Closed price by a buyer(short sale) | $ 100,000.00 | The amount Ocwen will get from the short sale | Borrower Input |
| Different investors for 1st and 2nd lien | 1 | 3 signifies different investors for the liens | REALS |
| The next best option below FCLS with an NPV | 6% | This is the sensitivity limit of NPV for specifying the next best option if AOMK DIL or shortsale come out to be the prioritized feasible options | Key Assumptions |

STAT MODELS / Key Assumptions / Initial Questions - Borrower / Consultant Screen / Resolution Screen 1 / Resolution / Questions after Resl

FIG.13E

Key Assumptions

| | | | |
|---|---|---|---|
| Both liens serviced by Ocwen | 1 | 1 signifies that both liens are serviced by Ocwen | REALS |
| Property Type | SF | Property type of the borrower | REALS |
| State | ND | State of the borrower | REALS |
| Property Type/State/Value Range | SFNDM | | Derived |
| Property Value range | M | Specifies a property range (<=$80000 is L, <$80000 is S, and the rest is M) | N/A |
| Existing Plan (1st lien) | FRM | You can enter only FRM/ARM here | REALS |
| Hold/Stop State | STOP | Specifies whether the borrower is in the stop or hold state | REALS |
| Existing Pre step interest rate (1st lien) | 8% | This is the pre step interest rate (if applicable) on an existing FRM for a 1st lien | REALS |
| Existing Pre step interest rate (2nd lien) | 8% | This is the pre step interest rate (if applicable) on an existing FRM for a 2nd lien. | REALS |
| Reset after period? (FR&E 1st lien) | 4 | This is the step up period on an FRM for a 1st lien if applicable | REALS |
| Reset after period? (FR&E 2nd lien) | 9 | This is the step up period on an FRM for a 2nd lien if applicable | REALS |
| Existing post step interest rate (1st lien) | 10% | This is the post step interest rate (if applicable) on an existing FRM for a 1st lien | REALS |
| Existing post step interest rate (2nd lien) | 10% | This is the post step interest rate (if applicable) on an existing FRM for a 2nd lien | REALS |
| ARM-Benchmark rate (1st lien) | 8% | It's the benchmark index for an ARM | REALS |
| ARM-Margin (1st lien) | 4% | This is the margin used to calculate the interest rate applicable over the benchmark index | REALS |
| ARM-Teaser Rate (1st lien) | 6% | This is the initial teaser rate in an ARM | REALS |
| ARM-First Rate Reset (1st lien) | 0 | This is the time after which the teaser period ends and the ARM starts. | REALS |
| ARM-Subsequent Reset Interval (1st lien) | 4 | This signifies the time after which the interest rates change in an ARM. | REALS |
| | | This is the maximum change in the interest rate | REALS |

Key Assumptions

| | A | B | C | D | E | F | G |
|---|---|---|---|---|---|---|---|
| | Has the loan already been on a modification plan | N | if Value="Y" Management approval needed | REALS | | | |
| | Financials>180 days old | N | if Value="Y" Management approval needed | REALS | Counter offer DIL in months to vacate the property) | 12 | It is used to fill the Cash for keys metric in the Shortsale calculations tab |
| | Loan <60 days delinquent | N | if Value="Y" Management approval needed | REALS | Initial Offer: DIL in months to vacate the property, in months) | 12 | |
| | Approval of Mortgage Insurance Loans from MI Company | Y | if Value="N" Management approval needed | REALS | | | |
| | Ocwen owned loans | Y | if Value="Y" Management approval needed | REALS | | | |
| | Delinquent Loans of Iowa and West Virginia | N | if Value="Y" Management approval needed | REALS | | | |
| | Allow short sale if second lien is not paid off | Y | if Value="N" Management approval needed | Key assumption | | | |
| | Underwriters Constraints Met | Y | | | | | |
| | Management's Approval Needed? | Y | | | | | |
| | Investor Number | Mods | | Investor Approval for Mods | Contract Contract Compliance | Director approval required | TONY DIGIOVINE S APPROVAL / VP approval |

| Microsoft Excel - Loan Resolution Cash Flow Model V94 | | | | | |
|---|---|---|---|---|---|
| R15 | =IF (AH\$Q\$15=1, Key Assumptions!\$B\$9=1), CONCATENATE (Resolution_Screen_1!\$U\$41, TEXT(Resolution_Screen_1!F16, 0.00%),<br>Resolution_Screen_1!F16,9"),Resolution_Screen_1!\$U\$42, TEXT(IF(Key Assumptions!\$F\$21=1, \$B\$54+G15,G16), \$0.00"), Resolution_Screen_1!\$U\$43, TEXT(<br>Resolution_Screen_1!\$U\$44, TEXT(Resolution_Screen_1!F15, 0.00%"), Resolution_Screen_1!\$U\$45, TEXT(<br>Resolutionm!\$X\$5, "\$0.00"),Resolution_Screen_1!\$U\$46, TEXT(Key Assumptions!\$F\$24, "0"),\$U\$47,".") | | | | |
| A | Resolution Screen_1 | | | | |
| Resolution<br>Option | Description | NPV 1st<br>lien | Prioritize<br>d feasible<br>option 1st<br>lien | Resolution Script (at lien) | NPV 2nd<br>d feasible<br>lien | Prioritize<br>option 2nd<br>lien |
| Step Balloon | Vary the amortization period, interest rates,<br>step-up periods and down-payments to make<br>the loan affordable to the borrower | \$ 157,587.79 | 0 | | \$ 3,293.91 | 0 |
| Step Balloon | Vary the amortization period, interest rates,<br>step-up periods and down-payments to make<br>the loan affordable to the borrower | \$ 157,582.09 | 0 | | \$ 2,210.07 | 0 |
| Step Balloon | Vary the amortization period, interest rates,<br>step-up periods and down-payments to make<br>the loan affordable to the borrower | \$ - | 0 | | \$ - | 0 |
| Step Balloon | Vary the amortization period, interest rates,<br>step-up periods and down-payments to make<br>the loan affordable to the borrower | \$ - | 0 | | \$ - | 0 |
| Step M30 | Vary the step up period, interest<br>rates, downpayment upto a point the loan<br>becomes affordable to the borrower | \$ 162,349.86 | 1 | We can help you by offering you a discounted monthly mortgage rate of 3.82% giving you a monthly payment of only \$1464.94 for the next 26 months. After that your interest rate will become 4.3% for the remaining term of the loan. All you have to do to qualify for this offer is to make a down payment of \$2370.01 which will be due in 15 days | \$ 3,293.94 | 1 |
| Step M30 | Vary the step up period, interest<br>rates, downpayment upto a point the loan<br>becomes affordable to the borrower | \$ 162,753.29 | 2 | | 0 3,293.94 | 1 |
| Step M30 | Vary the step up period, interest<br>rates, downpayment upto a point the loan<br>becomes affordable to the borrower | \$ 162,746.79 | 3 | | \$ 3,293.94 | 1 |
| Step M30 | Vary the step up period, interest<br>rates, downpayment upto a point the loan<br>becomes affordable to the borrower | \$ 162,730.99 | 4 | | \$ 3,293.94 | 1 |

| | A | B | C | D | E | F | G | H |
|---|---|---|---|---|---|---|---|---|
| | Microsoft Excel - Loan Resolution Cash Flow Model V94 | | | | | | | |
| | C27 | ▼ | *fx* =IF(Key Assumptions!F30<30,"N","Y") | | | | | |
| | | | | | Consultant Screen | | | |
| | | | | | Total | $ 500.00 | Derived | 2nd lien contribution (if serviced by someone other than Ocwen) |
| | Monthly tax payments | $ | 137.42 | REALS | Monthly tax payments(after manual editing,if any) | $ - | $ 137.42 | Total |
| | Monthly insurance payments | $ | 217.00 | REALS | Monthly Insurance payments(after manual editing,if any) | $ - | $ 217.00 | |
| | Rental Income after taxes | $ | 1,854.42 | Borrower | | | | |
| | Total Expenses | $ | | Derived | | | | |
| | Total Net Monthly Income after taxes | $ | 2,000.00 | Borrower | | | | |
| | Affordable P&I | $ | 145.56 | Derived | Affordable P&I after the cushion limit | $ 116.40 | | |
| | Borrower Inputs | | | | | | | |
| | Borrower's consent for OIL | | N | | | | | |
| | Buyer available for short sale | | Y | | | *Loan Resolution Optimization* | | |
| | Quoted price by a buyer (in Case of short sale) | $ | 100,000.00 | | | | | |
| | Applicable Quoted price by a buyer(short sale) | $ | 100,000.00 | | | | | |

FIG.13M

| | A | B | C | D | E | F |
|---|---|---|---|---|---|---|
| 1 | | =IF(C15="Y","When did you file bankruptcy(*:*)") | | | | |
| 2 | | | | | Initialization of Inputs | |
| 3 | | Please provide details as to your reason for default. | | | | |
| 4 | | Do you live in the home? | N | | | |
| 5 | | Is the home a rental property? | N | | | |
| 6 | | It appears that the home is not your primary or a rental property. Please provide details as to the type of property this is | | | | |
| 7 | | | N | | | |
| 8 | | Have you filed for bankruptcy? | $ - | | | |
| 9 | | | N | | | |
| 10 | | | | | | |
| 11 | | | | | | |
| 12 | | Are there other liens on this property? | Y | | | |
| 13 | | How much do you pay each month for the 2nd lien that is not serviced by Ocwen? | $ - | | | |
| 14 | | How much do you pay each month for the 1st lien that is not serviced by Ocwen? | $ - | | | |
| 15 | | Do you wish to remain in the home? | N | | | |
| 16 | | If the home was more affordable, would you consider remaining? | | | | |
| 17 | | Have you listed your home for sale? | Y | | | |
| 18 | | What is the contact information for your realtor? Enter details | | | | |
| 19 | | How long has the property been listed? | | | | |
| 20 | | What is the listing price? | | | | |
| 21 | | How many showings have you had? | | | | |
| 22 | | Do you have an offer for the home? | Y | | | |
| 23 | | How much is the net offer? | $ 100,000.00 | | | |
| 24 | | | 0 | | | |
| 25 | | | | | | |
| 26 | | | | | | |

FIG. 13N

Microsoft Excel - Loan Resolution Cash Flow Model V94

B5    /x  =IF(A5=0,VLOOKUP(A5,STAT_MODELS!$A$8:$D$15,4),STAT_MODELS!$D$15)

| | A | B | C | D | E | F | G | H |
|---|---|---|---|---|---|---|---|---|
| | | Straight MOD/Step MOD (1st Lien) | | | | Discount MOD/Step Discount MOD (1st Lien) | | |
| | Period | Probability of Prepayment | Probability of Default | Survival Probability | | Probability of Prepayment | Probability of Default | Survival Probability |
| | 0 | 0.01% | 0.01% | 100.00% | | 0.01% | 0.01% | 100.00% |
| | 1 | 0.09% | 0.02% | 99.96% | | 0.09% | 0.02% | 99.96% |
| | 2 | 0.19% | 0.05% | 99.87% | | 0.19% | 0.05% | 99.87% |
| | 3 | 0.22% | 0.16% | 99.63% | | 0.22% | 0.16% | 99.63% |
| | 4 | 0.59% | 6.56% | 99.24% | | 0.59% | 6.55% | 99.24% |
| | 5 | 1.02% | 7.55% | 92.19% | | 1.02% | 7.55% | 92.19% |
| | 6 | 1.54% | 6.35% | 84.35% | | 1.54% | 6.35% | 84.35% |
| | 7 | 2.68% | 5.86% | 77.78% | | 2.68% | 5.86% | 77.78% |
| | 8 | 2.36% | 5.40% | 71.25% | | 2.36% | 5.40% | 71.25% |
| | 9 | 2.21% | 4.06% | 65.82% | | 2.21% | 4.06% | 65.82% |
| | 10 | 2.21% | 4.06% | 61.73% | | 2.21% | 4.06% | 61.73% |
| | 11 | 2.21% | 4.06% | 57.90% | | 2.21% | 4.06% | 57.90% |
| | 12 | 2.21% | 4.06% | 54.31% | | 2.21% | 4.06% | 54.31% |
| | 13 | 2.21% | 4.06% | 50.94% | | 2.21% | 4.06% | 50.94% |
| | 14 | 2.21% | 4.06% | 47.78% | | 2.21% | 4.06% | 47.78% |
| | 15 | 2.21% | 4.06% | 44.82% | | 2.21% | 4.06% | 44.82% |
| | 16 | 2.21% | 4.06% | 42.04% | | 2.21% | 4.06% | 42.04% |
| | 17 | 2.21% | 4.06% | 39.43% | | 2.21% | 4.06% | 39.43% |
| | 18 | 2.21% | 4.06% | 36.98% | | 2.21% | 4.06% | 36.98% |
| | 19 | 2.21% | 4.06% | 34.69% | | 2.21% | 4.06% | 34.69% |
| | 20 | 2.21% | 4.06% | 32.54% | | 2.21% | 4.06% | 32.54% |
| | 21 | 2.21% | 4.06% | 30.52% | | 2.21% | 4.06% | 30.52% |
| | 22 | 2.21% | 4.06% | 28.62% | | 2.21% | 4.06% | 28.62% |
| | 23 | 2.21% | 4.06% | 26.85% | | 2.21% | 4.06% | 26.85% |
| | 24 | 2.21% | 4.06% | 25.18% | | 2.21% | 4.06% | 25.18% |

METHOD AND SYSTEM FOR AN INTEGRATED APPROACH TO COLLECTIONS CYCLE OPTIMIZATION

CLAIM OF PRIORITY

This application is a continuation of U.S. patent application Ser. No. 12/731,888, filed Mar. 25, 2010, now U.S. Pat. No. 8,473,391, issued Jun. 25, 2013, which is a continuation of U.S. patent application Ser. No. 12/651,020, filed Dec. 31, 2009, titled "METHOD AND SYSTEM FOR AN INTEGRATED APPROACH TO COLLECTIONS CYCLE OPTIMIZATION," now abandoned; which claims the benefit of priority to Indian Provisional Patent Application No. 2743/MUM/2008 titled "METHOD AND SYSTEM FOR COLLECTIONS OPTIMIZATION" filed Dec. 31, 2008, now expired, and to Indian Provisional Patent Application No. 734/MUM/2009 titled "METHOD AND SYSTEM FOR AN INTEGRATED APPROACH TO COLLECTIONS CYCLE OPTIMIZATION" filed Mar. 26, 2009, now expired. Each of the preceding applications is incorporated by reference herein in its entirety.

BACKGROUND OF THE INVENTION

1. Field of the Invention

Aspects of the present invention relate to the field of methods and systems for loan and mortgage collection and to methods and systems for aiding loan and mortgage collection, and in particular to optimization routines that decrease variability in the collecting process. Aspects of the present invention also relate to methods and systems for debt collection in general, as well as for using behavioral analysis in methods and systems to provide quantitative predictions of economically relevant activities.

2. Background of the Technology

There is an unmet need in the related art for collection management methods and systems that use a combination of psychometric, economic and other types of analyses to decrease the variability of outcome in the lending process. There is also an unmet need in the related art for collection management methods and systems to generate scripts for improving communication between lenders and Borrowers, based not only on optimized loan scenarios, but also on a behavioral analysis of the Borrowers themselves. There is a further unmet need for collection management methods and systems that include optimization, cash flow, and statistical models to determine optimal loan resolution.

SUMMARY OF THE INVENTION

Particular variations of methods and systems for an integrated approach to collections cycle optimization described in accordance with aspects of the present application may satisfy one or more of the above identified needs, as well as others, by providing, methods and systems for an integrated approach to collections cycle optimization, methodologies, metrics and methods of using each of the above, that, among other things, may improve loan collection performance by reducing variability in the collections cycle, reducing the costs and complexity associated with loan collection and allowing greater flexibility in loan collection. In addition, variations of methods and systems for an integrated approach to collections cycle optimization described in accordance with aspects of the present invention may include the capability of contemporaneously or independently optimizing personnel, communication, and collection procedure issues.

With these features and others, aspects of the present invention thereby provide other advantages, such as reducing variability in the collections cycle, reducing instances of foreclosure in collection, and increasing Borrower satisfaction in the collection process.

Particular aspects of the present invention provide methods and systems for assisting in identifying and selecting more successful loan collection staff. Among other things, particular aspects of the present invention provide a methodology for selecting candidate loan officers, based on behavioral attributes, personnel history, and human resources information, among other factors. In order to overcome problems with personnel issues, among other things, particular aspects of the present invention may provide for methods to identify the most capable loan collection staff, and to identify the most successful practices of the most successful staff using a combination of computational modeling, behavioral science, and econometrics, for example.

Another exemplary aspect of the present invention includes methods and systems for generating scripts that improve the effectiveness of communication between loan collection staff and Borrowers. In order to overcome problems with communication issues, among other things, particular aspects of the present invention provide for methods and systems to identify the most effective scripts for a given situation, to identify the most successful practices in communicating with Borrowers, and for standardizing communication between loan collection staff and Borrowers by using a combination of computational modeling, behavioral science, and econometrics, for example.

Another exemplary aspect of the present invention includes methods and systems for determining an optimized collection program for a particular Borrower. The optimized collection program depends on the optimization of several potential vectors associated with the terms and conditions of the collection process, and generally may be optimized to best suit the needs of a particular Borrower. In order to overcome problems with collection optimization issues, among other things, particular aspects of the present invention provide for methods and systems to identify the best collection scenario among the available options, using a combination of computational modeling, behavioral science, and econometrics, for example.

An aspect to the present invention, in certain variations, is to integrate more than one of the above mentioned features. For example, in a variation of the invention, methods and systems for assisting in identifying and selecting more successful loan collection staff, methods and systems for generating scripts that improve the effectiveness of communication between loan collection staff and Borrowers, and methods and systems for determining an optimized collection program for a particular Borrower are integrated in a single package or suite of packages. This approach may include the integration of several different aspects and methodologies performing quantitative and behavioral analyses, either contemporaneously or sequentially. Such an integrated, multi-tool approach is an aspect of variations of the invention.

Additional advantages and novel features relating to methods and systems for an methods and systems for an integrated approach to collections cycle optimization will be set forth in part in the description that follows, and in part will become more apparent to those skilled in the art upon examination of the following or upon learning by practice of aspects of the invention.

BRIEF DESCRIPTION OF THE FIGURES

In the drawings:

FIGS. 2A and 2B schematically represent some of the major sources of variability in the collections cycle as utilized in accordance with aspects of the present invention;

FIGS. 4A and 4B show exemplary approaches that may be used in assessing the personality traits of the candidates in accordance with aspects of the present invention;

FIG. 6 shows two examples of the manipulation of behavioral norms in scripting loan officer conversation with Borrowers in accordance with aspects of the present invention;

FIG. 8B presents an exemplary list of cash outflows that may be part of the cash flow model 701 analysis depicted in FIG. 8A;

FIG. 8C presents an exemplary list of cash inflows that may be part of the cash flow model 701 analysis depicted in FIG. 8A;

FIG. 9B shows exemplary inputs and sources in addition to those provided in FIG. 9A, in accordance with aspects of the present invention;

FIG. 10B provides an exemplary list of modifications for the variables of FIG. 10A that may be considered in the optimization process, in accordance with aspects of the present invention;

FIG. 11B shows exemplary variables used to make probability predictions for the probability cash flow calculation shown in FIG. 11A, in accordance with aspects of the present invention;

FIGS. 13A-13P show exemplary graphical user interface (GUI) screens for use in accordance with aspects of the present invention.

DETAILED DESCRIPTION

Aspects of the present invention and implementations thereof, are not limited to the specific methods and systems, software, methodologies, models, variables or procedures disclosed herein. Many additional methodologies, models, variables or procedures known in the art consistent with the intended methods and systems for an integrated approach to optimize the collection cycle will become apparent for use with particular aspects and implementations from this disclosure. Accordingly, for example, although particular methodologies, models, variables or procedures are disclosed, such methodologies, models, variables or procedures may include additional features, alternate definitions, different procedural steps, etc. consistent with the intended optimization of the collection cycle.

Description of exemplary aspects and implementations of the methods and systems for an integrated approach to optimize the collection cycle will now be made with reference to the appended drawings.

The problem of optimizing collection cycles in lending is complex and involves the intersection of economics, human capital issues and psychology, among other issues. Although many metrics are available for the quantitative estimation of critical parameters such as the Borrower's needs, the capabilities of support staff to meet those needs, probability of default, for example, predicting successful outcomes requires using these variables in ways that are not readily apparent. Further, inherent variability in both the lending process as a whole and in the measurement of input variables for optimization methodologies can render accurate predictions of outcome virtually impossible or, at least, computationally prohibitive. In this context, optimization routines that successfully decrease variability in the lending process are valuable tools for the lender and the collector. Even if they do not yield a single optimized path to a successful outcome, these optimization routines can be used to focus the efforts of staff towards minimizing problems that may occur during the process, for example.

Figure 1:
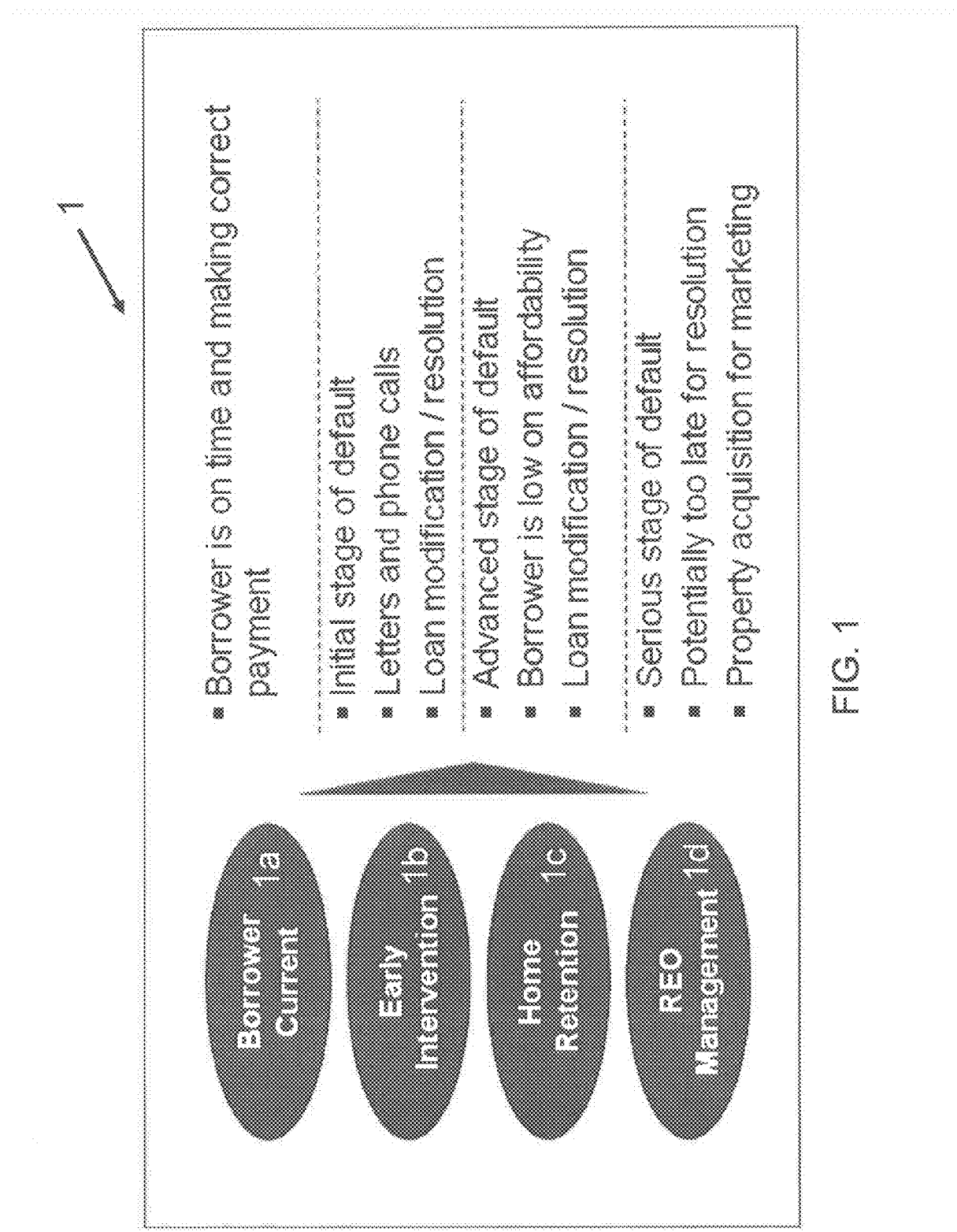
FIG. 1 provides an overview of the collections cycle from the situation in which the buyer makes on time payments to serious default as utilized in accordance with aspects of the present invention.

FIG. 1 provides an overview of the collections cycle 1 from the situation in which the borrower makes on time payments to serious default. In the Borrower Current 1a stage, the Borrower makes on-time payments and there is usually little indication of potential default beyond prior credit history. The cycle progresses to the Early Intervention 1b stage, one day after the account has been delinquent and remains in this stage for a subsequent 90 day period. Early Intervention 1b often represents the best opportunity for correction and can be especially critical. Generally, at this stage, the ability of the Borrower to continue payment has not been exhausted, nor has the amount of default exceeded the Borrower's means. In this stage, collection may begin with a series of letters and telephone calls (including conversations between the Borrower and collection professionals), for example. The terms and conditions of the loan may be modified in the Early Intervention 1b stage in order to prevent more severe default. Home retention begins 90 days after the first default and can be considered to be the first advanced stage of default. In this stage, the Borrower's ability to pay has been compromised, as the outstanding debt has generally become large relative to the Borrower's means. As with the previous stage, modifications of the terms of the loan are again possible. However, at this stage, balancing the Borrower's needs becomes more difficult, and risk increases. Finally, the cycle moves into the last stage of default, "REO Management" 1d which involves repossession and sale of the loan collateral. It should be noted that, although one of the most applicable loan scenarios for the program described herein is a mortgage, the methodologies, metrics and programs are equally applicable to other scenarios involving substantial collateral. In the "REO Management" 1d stage, resolution is unlikely. Generally, the property is acquired so that it can be sold and costs of the loan process recouped.

Generally, it is advantageous for all parties, Borrowers and Lenders, to avoid the latter stages of default (i.e., stages 1c and 1d). Although traditional methods and protocols achieve some success in modifying the loans at earlier stages, this process would benefit from a systematic approach yielding more consistent results. One impacting factor on such an approach is to diagnose sources of variability in the cycle shown in FIG. 1, and either eliminate or diminish the effects of these sources.

Referring now to FIGS. 2A and 2B, although variability in the cycle may depend on a variety of factors, it is clear that it will at least depend on the quality of personnel 5a employed in collections (e.g., the loan officers or other lending personnel), the persuasiveness of the communication 5b between the personnel and the Borrower, and the ability of the personnel to identify an optimal resolution 5c or a collection program that maximizes the ability and willingness of the Borrower to make payments before the debt reaches the advanced stages of default. Each of these aspects is represented schematically in both FIGS. 2A and 2B. The disks associated with each of the three aspects 5a-5c in FIGS. 2A and 2B are meant to represent the magnitude of variability for each factor. The overlap of each of the three factors 5a-5c in FIGS. 2A and 2B represents a "perfect storm" during the collection phase, e.g., the situation in which each of the three factors (Personnel 5a, Persuasive Communication 5b and Identifying Optimal Resolution 5c) have combined to yield the most successful outcome possible. Since this overlap is generally inversely related to the degree of variability of each factor, the schematic suggests (FIG. 2B) the intuitive result that minimizing the variability of each of these three aspects reduces the overall variability in the collections process and, on average, leads to more positive outcomes.

First, it may be important to determine the most effective personnel to serve as loan officers from an array of possible candidates. This can be accomplished by a variety of methods, including using personality-based questionnaires. A series of advantageous personality traits can be pre-determined and candidates demonstrating those traits in questionnaire results can be selected in order to obtain capable personnel 5a. Further, optimizing the persuasiveness of the communication 5b of loan officers with the Borrowers (the "Persuasive Communication" element in FIGS. 2A and 2B) can be very helpful. Here conventional training of personnel can be augmented by providing dynamic, situation responsive scripting. In addition, as indicated in FIGS. 2A and 2B, "Identifying Optimal Resolution" 5c refers to identifying the optimized loan scenario for a particular client. This generally includes specifically tailoring the loan payments, interest rates, etc. so that the Borrower may avoid default. This particular aspect of the process may be optimized by a variety of techniques, including through the use of computational methodologies borrowed from a variety of different fields of research (including, but not limited to econometrics).

A certain amount of variability in the collection cycle is inherent. As shown in FIG. 2B, honing each of the aspects of the process discussed above can minimize or decrease the variability due to each individual aspect. For example, relying on the intuition of appropriately selected loan officers, as well as assuring that they are properly trained, can lead to the diagnosis of potentially severe default early in the process, as well as aid in its prevention. Coupling these attributes with a comprehensive loan program modeling and optimization scheme can provide a powerful method for minimizing variability and avoiding foreclosure in many instances.

Figure 3A:
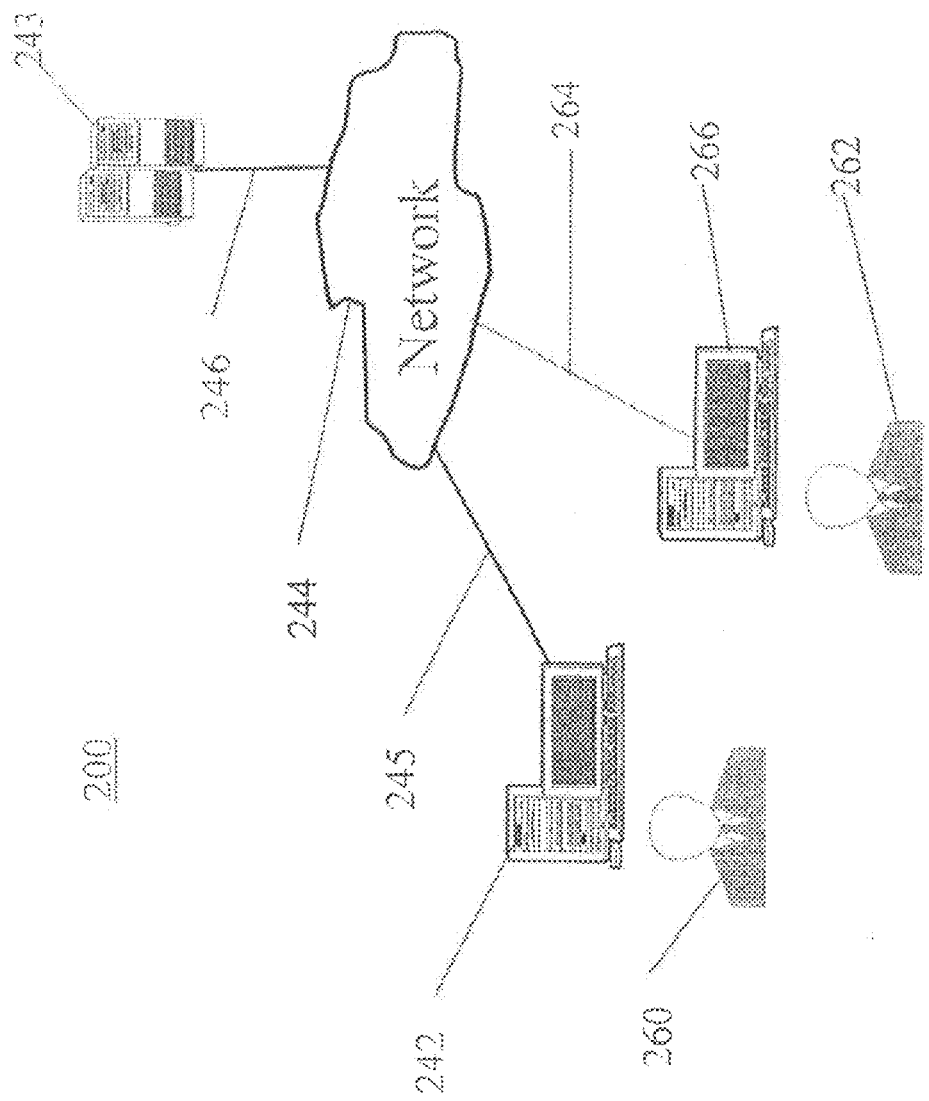
FIG. 3A shows an exemplary computer system capable of carrying out the functionality as utilized in accordance with aspects of the present invention.

The present invention may be implemented using hardware, software, or a combination thereof and may be implemented in one or more computer systems or other processing systems. In an aspect of the present invention, the invention is directed toward one or more computer systems capable of carrying out the functionality described herein. An example of such a computer system 100 is shown in FIG. 3A.

Computer system 100 includes one or more processors, such as processor 104. The processor 104 is connected to a communication infrastructure 106 (e.g., a communications bus, cross-over bar, or network). Various software aspects are described in terms of this exemplary computer system. After reading this description, it will become apparent to a person skilled in the relevant art(s) how to implement the invention using other computer systems and/or architectures.

Computer system 100 can include a display interface 102 that forwards graphics, text, and other data from the communication infrastructure 106 (or from a frame buffer not shown) for display on a display unit 130. Computer system 100 also includes a main memory 108, preferably random access memory (RAM), and may also include a secondary memory 110. The secondary memory 110 may include, for example, a hard disk drive 112 and/or a removable storage drive 114, representing a floppy disk drive, a magnetic tape drive, an optical disk drive, etc. The removable storage drive 114 reads from and/or writes to a removable storage unit 118 in a well-known manner, Removable storage unit 118, represents a floppy disk, magnetic tape, optical disk, etc., which is read by and written to removable storage drive 114. As will be appreciated, the removable storage unit 118 includes a computer usable storage medium having stored therein computer software and/or data.

Alternative aspects of the present invention may include secondary memory 110 and may include other similar devices for allowing computer programs or other instructions to be loaded into computer system 100. Such devices may include, for example, a removable storage unit 122 and an interface 120. Examples of such may include a program cartridge and cartridge interface (such as that found in video game devices), a removable memory chip (such as an erasable programmable read only memory (EPROM), or programmable read only memory (PROM)) and associated socket, and other removable storage units 122 and interfaces 120, which allow software and data to be transferred from the removable storage unit 122 to computer system 100.

Computer system 100 may also include a communications interface 124. Communications interface 124 allows software and data to be transferred between computer system 100 and external devices. Examples of communications interface 124 may include a modem, a network interface (such as an Ethernet card), a communications port, a Personal Computer Memory Card International Association (PCMCIA) slot and card, etc. Software and data transferred via communications interface 124 are in the form of signals 128, which may be electronic, electromagnetic, optical or other signals capable of being received by communications interface 124. These signals 128 are provided to communications interface 124 via a communications path (e.g., channel) 126. This path 126 carries signals 128 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 180, a hard disk installed in hard disk drive 170, and signals 128. These computer program products provide software to the computer system 100. The invention is directed to such computer program products.

Computer programs (also referred to as computer control logic) are stored in main memory 108 and/or secondary memory 110. Computer programs may also be received via communications interface 124. Such computer programs, when executed, enable the computer system 100 to perform the features of the present invention, as discussed herein. In particular, the computer programs, when executed, enable the processor 110 to perform the features of the present invention. Accordingly, such computer programs represent controllers of the computer system 100.

In an aspect of the present invention where the invention is implemented using software, the software may be stored in a computer program product and loaded into computer system 100 using removable storage drive 114, hard drive 112, or communications interface 120. The control logic (software), when executed by the processor 104, causes the processor 104 to perform the functions of the invention as described herein. In another aspect of the present invention, the invention is implemented primarily in hardware using, for example, hardware components, such as application specific integrated circuits (ASICs). Implementation of the hardware state machine so as to perform the functions described herein will be apparent to persons skilled in the relevant art(s).

Figure 3B:
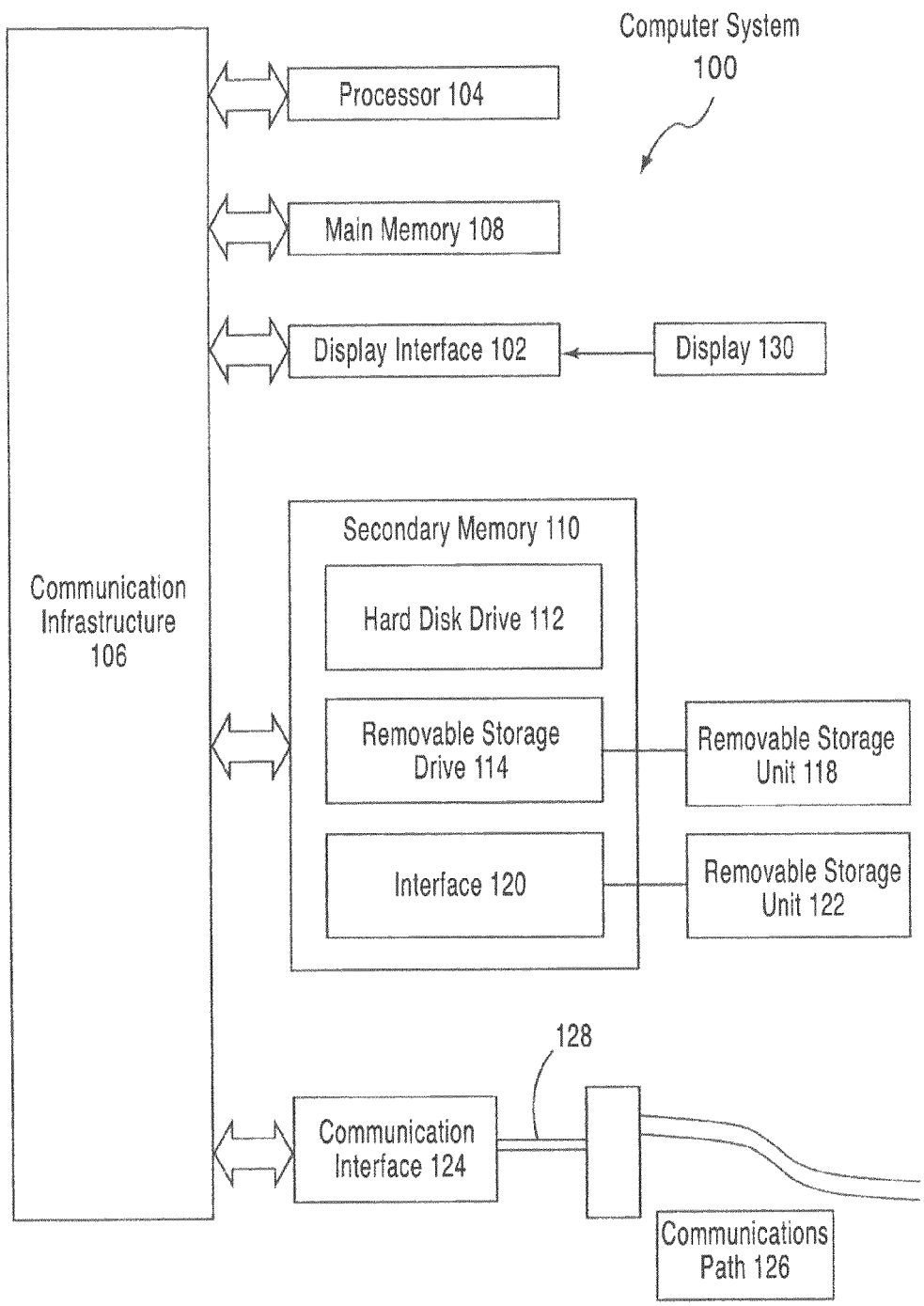
FIG. 3B shows a communication system 200 as utilized in accordance with aspects of the present invention.

In yet another aspect of the present invention, the invention is implemented using a combination of both hardware and software. FIG. 3B shows a communication system 200 usable in accordance with the present invention. The communication system 200 includes one or more accessors 260, 262 (also referred to interchangeably herein as one or more "users") and one or more terminals 242, 266. In one aspect of the present invention, data for use is, for example, input and/or accessed by accessors 260, 264 via terminals 242, 266, such as personal computers (PCs), minicomputers, mainframe computers, microcomputers, telephonic devices, or wireless devices, such as personal digital assistants ("PDAs") or a hand-held wireless devices coupled to a server 243, such as a PC, minicomputer, mainframe computer, microcomputer, or other device having a processor and a repository for data and/or connection to a repository for data, via, for example, a network 244, such as the Internet or an intranet, and couplings 245, 246, 264. The couplings 245, 246, 264 include, for example, wired, wireless, or fiberoptic links. In another aspect of the present invention, the method and system of the present invention operate in a stand-alone environment, such as on a single terminal.

Two-Stage Approach Overview

Figure 3C:
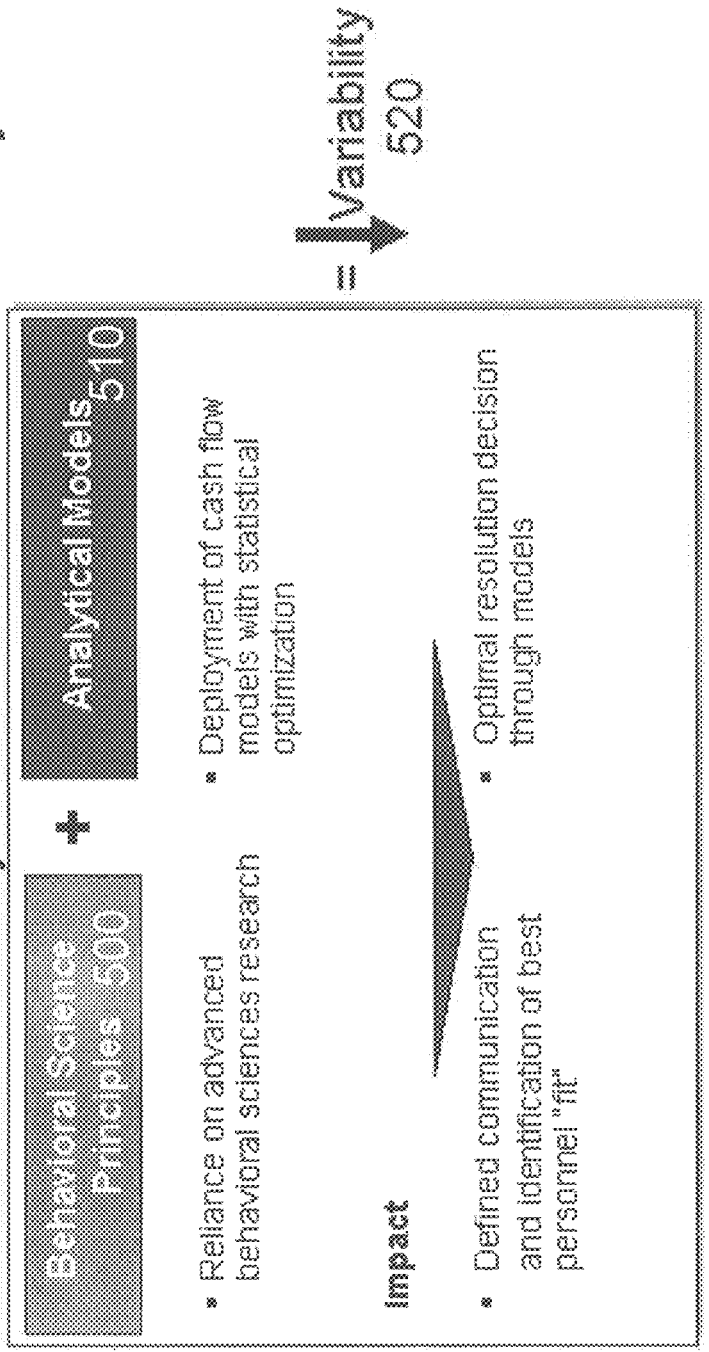
FIG. 3C shows the two stage approach that may be included in accordance with aspects of the present invention.

FIG. 3C shows an exemplary two stage approach that may be included as an aspect of the invention. The first stage 500 involves the use of Behavioral Science Principles, and the second stage 510 involves the use of Analytical models. Note that, although these stages are referred to in sequence, this sequence is arbitrary. It may be reversed or altered in other ways and still remain part of the invention, and the stages may also be performed contemporaneously. In the first stage 5000, Behavioral Science Principles may be used to select appropriate personnel 5a or loan officers who will interact with Borrowers and administer the appropriate terms of the loan. Here several categories of personality traits, including those relating specifically to the loan process, may be used to ascertain the fitness of candidates for loan officer positions, effectiveness of communication techniques, and other aspects of the collections cycle. Here also, behavior models can be used to optimize the effectiveness of the communication 5b between the loan officers and the Borrowers. In the second stage 510, Analytical Models can be used to obtain optimal loan collection programs 5c that will be tailored to the needs of each individual Borrower. As shown in FIG. 3C, applying the two stage process to the collection cycle over time may decrease the overall variability 520 of the process, diminish the percentage of Borrowers entering advanced stages of default, and diminish the need for foreclosure in the process. Note that the two stage approach is applicable to modeling various aspects of the collection cycle, including the three aspects shown in FIGS. 2A and 2B. Note further that the two stages 500 and 510 need not be employed in sequence. Further, certain tasks, methods or systems may require each of the steps 500 and 510 to be performed multiple times and/or contemporaneously.

Optimizing Collector Effectiveness

Generally, the method of optimizing collector effectiveness (or the "Personnel" 2a element of FIGS. 2A and 2B) may involve selecting from among loan officer candidates based on the personality traits of those candidates. Then, in one exemplary implementation in accordance with aspects of the present invention, the personality traits of the candidates are assessed first by applying Behavioral Science Principles (FIG. 3C). Subsequently, those personality traits are quantified according to a rating system and used in Analytical Models 510 (FIG. 3C) to predict various aspects of the loan officer candidate's performance. One of the goals of this model is to identify the important drivers of variability among collectors. Results can identify important drivers of variability in the collecting process by comparing traits associated with the best or most successful collectors and those of average or under-performing collectors. The important drivers of variability may be the areas of greatest demarcation between the best collectors and those who are average.

Figure 4A:
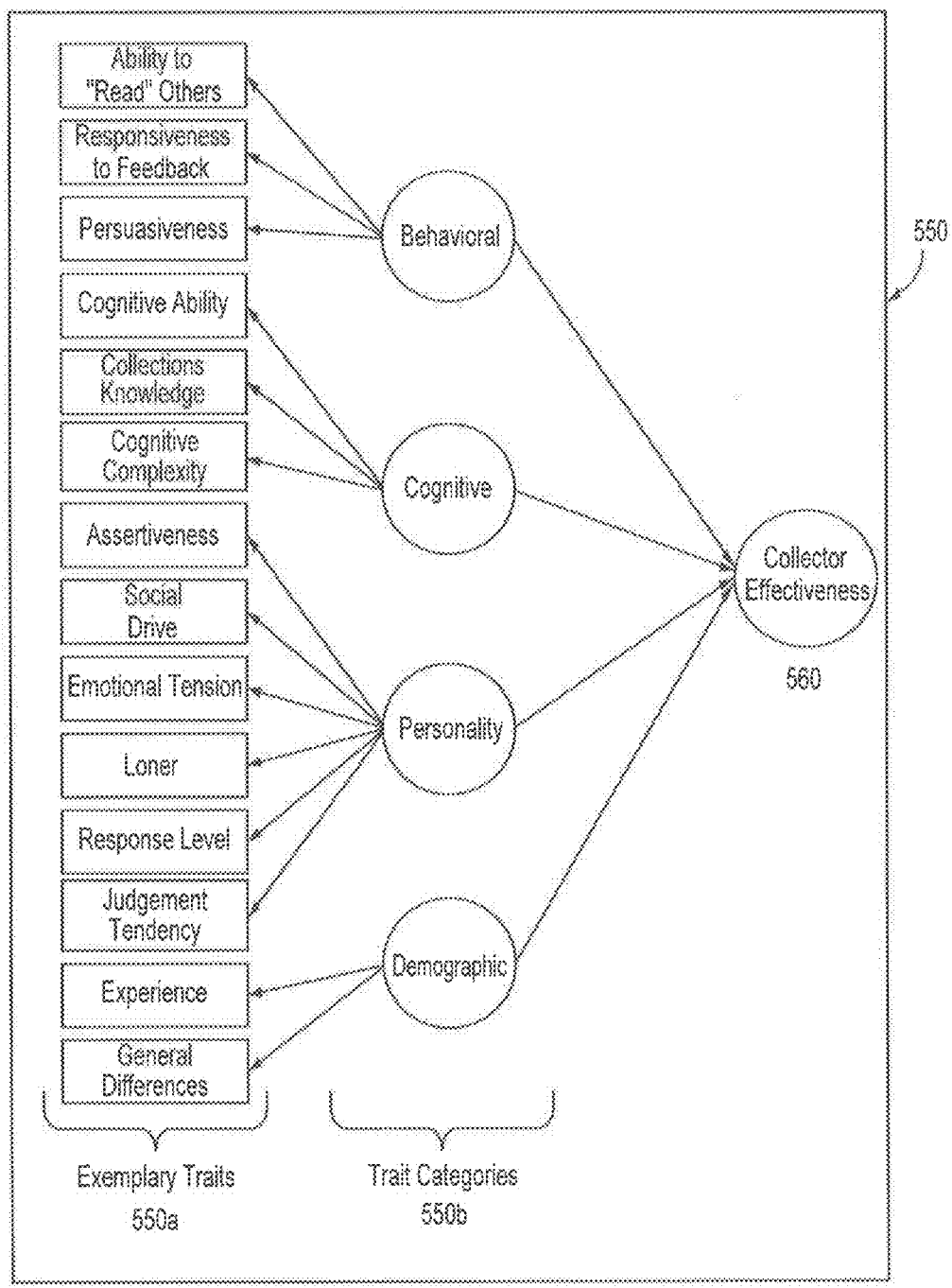

FIG. 4A shows an exemplary approach that may be used in assessing the personality traits 550 of the candidates. A collector effectiveness model 550 uses the traits 550 and categories of traits 550b to produce an estimate of collector effectiveness 560. The approach may generally include measuring personality traits 550a, collecting the traits into categories 550a, and generating an estimate 560 of collector effectiveness using computational or statistical methods from the traits. The actual generation of a prediction 560 of collector effectiveness, from the behavioral data may be accomplished by one of a number of different modeling procedures, which may include the use of "structural equations models," which will be discussed in further detail below. Here it is important to note that this general arrangement is inherently adaptable to other approaches as they develop. In particular, the methodology shown in FIG. 4A is meant to use new concepts in fields such as behavioral psychology, social psychology and workplace psychology, as they develop. One aspect of the method, then, is that it incorporates developments in these fields in an estimate of collector effectiveness that may be ultimately used to decrease variability in the collections cycle (FIG. 1).

The traits 550a on the left side as shown in FIG. 4A may be ascertained, measured, and quantified in a number of different ways. For example, candidates for loan officer positions may be evaluated using web or computer based questionnaires. The candidates may be asked to describe or rate their own personality traits 550a. Alternatively or in addition to this self-rating, the web or computer based questionnaires may contain questions designed by behavioral psychologists or other professionals, relating to hypothetical or other situations. Candidate responses to questions relating to the hypothetical or other situations may then be compiled and analyzed in a manner that allows rating of each of the traits used in the analysis. Alternatively, candidates may be evaluated directly by behavioral psychologists or other professionals who ascertain the traits of each of the candidates subjectively and/or based on the responses to questionnaires. In addition, some of the questionnaires may use concepts associated with an overall rating of personality (such as a "personality index") or other behavioral metric. Further, information gathered in other contexts and by other entities not necessarily associated with the modeling process may also be quantified and input into the model 550. For example, data collected by human resource departments or other organizations measuring aspects including those relating to background, personality traits 550a and/or work history may also be included in the analysis.

The traits 550a of FIG. 4A represent exemplary aspects of the candidate to be measured and included in an analysis of overall suitability for a loan officer position. FIG. 4A does not provide an exhaustive list of such traits 550a. In fact, the general approach shown in FIG. 4A may be adaptable to measure both additional traits 550a and additional classes of traits 550b. The trait categories 550b explored in some detail below are not an exhaustive list. Rather, they are meant to provide an overview of the types of categories 550b of behavioral and personality metrics that might be incorporated into a collector effectiveness model 550 within aspects of the present invention. This model 550 may be complimentary to other approaches so as to reduce variability in the manner schematically indicated in FIGS. 2A and 2B, for example. Each of the following traits 550a may be assigned a numerical rating for each candidate that is later used in structural equations models.

Exemplary Traits and Categories

Each of the following traits 550a may be assigned a numerical rating for each candidate that is later used in structural equations models.

Behavioral Traits

Generally speaking, traits falling into this category may relate to abilities or skills that are manifest in one's behavior. They may include the ability to sense emotions through the tone of conversations, the use of persuasive principles, and the ability to accept constructive criticism, in order to improve collections skills. Each of the traits may be "operationalized" or broken down into constituent components for ease of measure. For example, the "Behavioral" ability to read others" has several facets or sub-categories that may include empathy, open-mindedness, experience with others, etc. Each of the sub-categories or facets may be individually rated or may be collectively rated or scored. The ratings of each of the facets or sub-categories may be combined together to create a single score, or may be utilized separately.

Exemplary behavioral traits may include the ability to "read" others, general persuasiveness, assertiveness and experience, among others. Ability to read others, for example, may refer to the capacity of the candidate to understand and respond to the debtor's narrative and emotional undertone. The ability to read others can further include the following facets: empathy (feeling concern for the Borrower, attempting to understand his/her situation), open-mindedness (willingness to consider other people's views), quickness (ability to process complex individuals or situations), and sociability (experience with social interactions and the behavior of others).

Ability to read others, for example, may refer to the capacity of the candidate to understand and respond to the debtor's narrative and emotional undertone. The ability to read others may further be included of the following facets: empathy (feeling concern for the Borrower, attempting to understand his/her situation), open-mindedness (willingness to consider other people's views), quickness (ability to process complex individuals or situations), and sociability (experience with social interactions and the behavior of others).

Another exemplary behavioral trait may be the candidate's overall responsiveness to feedback. This trait is generally directed towards willingness to take advice from supervisors, be corrected, and learn from mistakes. It may include several sub-categories or elements, including: teamwork/citizenship (seeing oneself in the context of a greater group mission), dutifulness (willingness to follow rules and obey instructions), flexibility (being able to adapt one's current behavior to fit with new rules or norms), and humility (willingness to admit mistakes and take corrective action, if necessary).

Yet another exemplary behavioral trait that can be measured, quantified and used in modeling is the candidate's persuasiveness. This trait refers to the ability and skill set related to convincing others to comply with one's requests, among other things. Persuasiveness may be considered to be include the following facets: knowledge and use of principles of influence (tacit understanding of the laws that govern social influence), adherence to scripting (the use of and reliance on optimized scripting for one's responses to debtors), public self-consciousness (deriving self-concept from one's public actions), and impression management (the ability to control how one appears to others).

Cognitive Traits

Generally speaking, traits falling into this category relate to one's mental abilities, extant knowledge of collections, and desire for knowledge. Cognitive traits can be "operationalized" or broken down into constituent components for individual rating or scoring. The ratings of each of the facets or sub-categories may be combined together to create a single score, or may be utilized separately.

Exemplary cognitive traits include general cognitive ability. This component refers to mental capacity, processing speed, and the ability to generate ideas. It may be considered to include the following sub-components: Wonderlic Personnel Test score (Measures general intelligence, or aptitude), ingenuity (ability to generate new ideas), and creativity (capacity to create novel thought processes that are often not traditionally held).

Another exemplary cognitive trait is collections knowledge. This trait refers to how well one retains and uses information about collection practices and products. It can be considered to include the following facets: general collections knowledge (measured general knowledge of collections and best practices), product knowledge (assessment of specific knowledge about current products and initiatives), and legal knowledge (measured knowledge of Fair Debt Collection Practices Act and legal guidelines for collections activities).

Yet another exemplary cognitive trait is cognitive complexity. This trait refers to how much cognitive ability defines and informs one's self-concept or is part of one's self-identity. Cognitive complexity can include the following facets: overall complexity (how varied and intricate one's beliefs and interests are), need for cognition (how much one values and relies upon effortful cognitive activities), and openness to experience (measured intellectual curiosity and desire to learn). Personality Traits Generally speaking, traits falling into this category relate to one's characteristics traditionally seen as distinguishing one individual for another. These traits may include quirks or peculiarities. Personality traits may be "operationalized" or broken down into constituent components for individual rating or scoring. The ratings of each of the facets or sub-categories may be combined together to create a single score, or may be utilized separately.

Exemplary personality traits include assertiveness. This component refers to the expression of one's values and opinions, as well as how one sees oneself in relation to others. Assertiveness may include the following facets: dominance (the need to impose one's will on others), proactiveness (the desire to fight for one's agenda), leadership (the willingness to take charge of a situation and be responsible for the results), and competitiveness (deriving esteem from comparing one's own actions or goals with those of others).

Another exemplary personality trait in the category is the candidate's social drive. This refers to deriving self-esteem from, and behaving in a manner consistent with, being extraverted or introverted. Social drive can include following facets: talkativeness (how likely one would be to initiate and maintain conversations), social skillfulness (one's adeptness at navigating social situations), and expression (how easily one can discuss emotional content).

Yet another exemplary personality trait in the category is the level of detail. This refers to attentiveness to detail, punctuality, and neatness, generally. Attentiveness to detail can include the following facets: conscientiousness (being painstaking and careful), orderliness (following routines where appropriate), and perfectionism (feeling happiness only when one's expectations are completely met).

Yet another exemplary personality trait is response level. This refers to stamina, self-control, and capacity to handle stress. Response level can include the following facets: industriousness (persistence in one's work), perseverance (generalized persistence across domains of life), and self-regulation (the ability to exert self-control and/or delay gratification).

Yet another exemplary personality trait in this group is the candidate's judgment tendency. This trait refers to the candidate's reliance on objectivity when making decisions. Judgment tendency can include the following facets: emotionality (how likely one is to rely on emotional experience), rationality (how likely one is to rely on logic), etc.

Demographic Traits

Generally speaking, traits falling into this category relate to one's demographic characteristics. These traits may include the following elements: experience (this trait refers to tenure at the loan or collecting entity—this trait can be used to, among other things, determine whether collectors become more effective with more practice), age (proxy for life experience), gender (research suggests that persuasion targets (in this case, debtors) see men as more dominant, while women are seen as possessing greater levels of empathy).

In addition to using the traits to generate a single, monolithic estimate of overall lender effectiveness, it is also possible to classify traits according to various sub-categories or metrics that correlate with effective lending practices. For example, the traits may be recombined to measure such factors as "reach" (broadly defined as "right party contact" or the ability of the candidate to determine, find, solicit, or distinguish "proper" prospective Borrowers, or prospective Borrowers who are good candidates for a loan). Another metric that may be estimated using the traits (or combination of the traits) is the "yield" or the amount of money produced per "right party contact." In this way, the traits may be used to generate quantitative predictions of several different aspects of the candidate's potential to perform as a loan officer. FIG. 4B shows the model 550 quantification of reach, conversion, and yield, as well as the relationship of each of these variables to overall collector effectiveness.

Candidate effectiveness, as predicted by the methods and systems, may be reported numerically. Alternatively, reporting of the prediction of candidate effectiveness may include various non-numerical aspects, predictions, and comments as generated by the model.

Optimization routines that can be used in and in conjunction with candidate effectiveness prediction, and in any other suitable model described herein, include each of (as well as combinations of) the following: structural equation-based modeling, Monte Carlo analysis, genetic methodologies, artificial neural networks, partial least squares, and the use of a variety of other statistical methods and techniques, including scoring based on outcome, various types of regression analysis (linear and non-linear), least-squares analysis, etc. A number of other types of statistical analysis may be also be used, depending on the availability, need, and computational resources to be used.

Optimizing Persuasive Communication

Generally, the method of optimizing persuasive communication between Borrower and lender in variations of the present invention involve generating a series of scripts that or other prompts or selection options (hereafter referred to interchangeably as "scripts") guide the communication between the loan officer and the Borrower through the lending process. A goal of the scripting initiative is to reduce variability by standardizing collector responses, thus maximizing the consistency of interactions, relying on best practices and psychological research to increase the value of the interactions. The scripts depend both on behavioral information concerning the Borrower, as it can be assessed in the collections process, as well as any other information that may be available. This analysis may involve an assessment of the personality traits of the Borrowers, as determined by applying Behavioral Science Principles (FIG. 3C). Subsequently, information specific to the Borrower, along with loan information, may be quantified according to a rating system and used in Analytical Models (FIG. 3C) to generate scripts to help the loan officer communicate effectively with the Borrower.

While the scripting initiative should compress the range of variability, as long as collectors are part of the chain of interaction between collector and debtor, personnel characteristics, like those in the Collector Effectiveness model (above), will moderate this relationship. Thus, improving both collector effectiveness and scripting approaches are necessary to reduce levels of variability and to maintain favorably low levels of variability.

Figure 5:
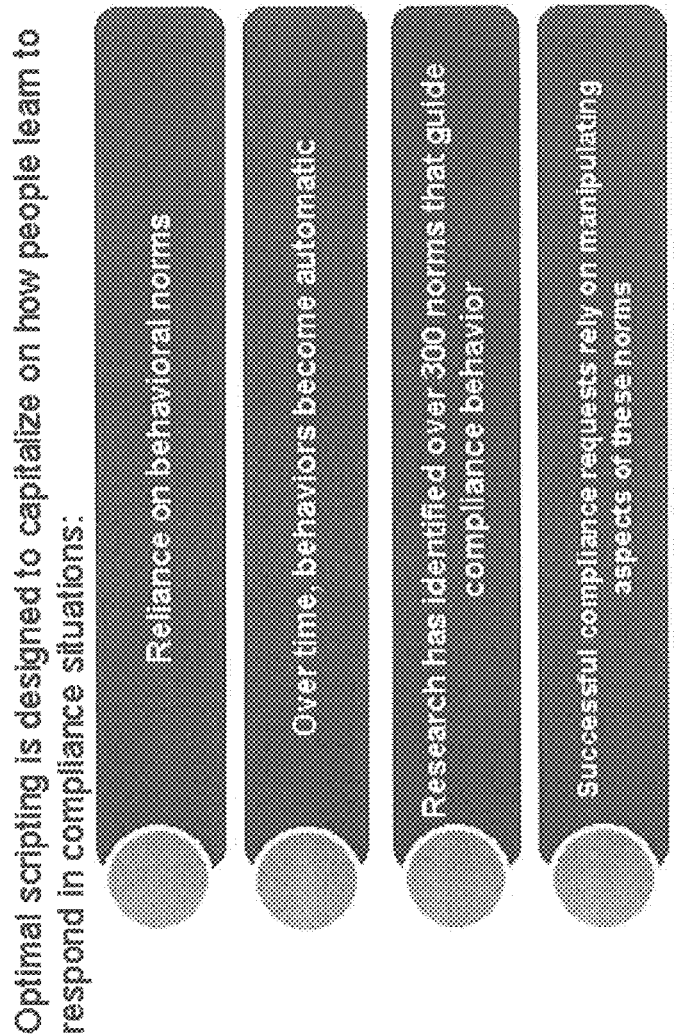
FIG. 5 provides a generalized, non-exhaustive description for the goals and methods of using behavioral science in conjunction with scripting routines to optimize the collection process in accordance with aspects of the present invention.

FIG. 5 gives a generalized, non-exhaustive description for the goals and methods of using behavioral science in conjunction with scripting routines to optimize the collection process. For example, FIG. 5 shows that the scripting process may rely on "Behavioral Norms." As indicated in FIG. 5, one of the advantages of using scripting methods and systems to aid in communication between loan officers and Borrowers is that the scripting methods and systems can help the loan officers phrase compliance requests and other communication with Borrowers in ways that both respect behavioral norms and also manipulate various aspects of the behavioral norms so as to further the collection process. Simply put, ascertaining not just what a Borrower needs to hear but also the way in which the Borrower needs to hear it may be extremely beneficial in preventing default.

Using behavioral norms in scripting can be performed in several ways. First, behavioral information (which may include information from direct observations; information from questionnaires; other sources, such as human resource departments; voluntarily offered information, etc.) concerning the Borrower may be input to the scripting methods and systems. This approach may be performed on a rolling basis, so that newly ascertained information can be entered during the collection process and also so that dynamic scripting can be made responsive to changes in conditions as they arise. In addition, the scripts themselves may be written with various behavioral norms or rules of decorum in mind. For example, if the Borrower has a tendency to respond adversely to overly aggressive communication and coercion, the scripts can be modified so that milder, less aggressive language is used. As shown in FIG. 5, background research has identified hundreds of such norms that can be incorporated directly in the scripting methods and systems. Also, behavioral norms may be regional and context specific. Scripting may be tailored for such features as the geographic or demographic situation of the Borrower, the time of year, etc. As indicated in FIG. 5, over time behavior and methods of communication induced by the scripting methods and systems in the loan officer should become automatic. In other words, use of the scripting methods and systems will tend to influence the behavior of loan officers during the collection cycle. If the scripting methods and systems are used with all or most of the collection officers in a given office or location, communication will tend to standardize between the loan officers and clients. Standardization in and of itself may tend to decrease variability in the collection process.

FIG. 6 shows two examples of the manipulation of behavioral norms in scripting loan officer conversation with Borrowers. In the first example, the Borrower confidence in the program is enhanced by offering "social proof," or proof of effectiveness of the loan program in a context appropriate for the Borrower. For example, the scripting methods and systems may diagnose either a skeptical Borrower, or a Borrower prone to skepticism, based on the analysis of Borrower behavior discussed above, among other things. In this situation, the scripting methods and systems may decide that reassurance of the program's effectiveness is warranted and that providing a quantitative demonstration of its effectiveness (e.g., for "40,000 homeowners in similar situations") may be useful. In additional or in other situations, depending on circumstances, the scripting methods and systems may determine that the particular Borrower could use an incentive outside of the ordinary course of the collection process. This incentive might apply to Borrowers who are especially resistant to payment requests, who have demonstrated some level of cynicism in the collection process and/or who have shown an interest in improving their credit, for example. The incentive may be two-fold, including a modification of the loan rate and a favorable reporting to credit agencies, for example. However, it is to be understood that a number of other incentives are possible, depending on the specific conditions of the Borrower, as well as the stage in the collections cycle.

The scripts can be generated by scripting methods and systems, referred to interchangeably herein as a "scripting engine." Although the scripting engine may operate in a number of different ways, one effective way of operating the scripting engine is to have the loan officer interact with the engine during the conversation with the Borrower. That is, the scripting engine may provide scripting information to the loan officer dynamically, through the course of the loan officer's conversation with the client. The loan officer, for example, may be speaking with the client over the telephone while running the scripting engine on a terminal or computer at his or her desk. As the conversation proceeds, the loan officer may enter data into the terminal or computer associated with the Borrower's responses to inquiries or other information, and the script engine may generate additional scripts according to the newly inputted data, as well as in response to data that has been stored previously.

The scripts generated by the process described above may govern or contribute to any aspects of the collection process. For example, scripts may be generated to introduce the loan officer and/or the institution to the client, to negotiate a payment schedule, and/or to navigate through complex issues associated with various stages of default, etc. In addition, the scripts may help the loan officer overcome objections to payments or to explain to the Borrower changes in the payment plan. The scripts may be completely determinative of the conversation between the loan officer and the Borrower, they may be only partially determinative or they may be merely suggestive. The scripts may contain optional conversations or conversation branches to be selected by the loan officer. The scripts may be interactive and/or contain a series of options based on information collected during the conversion, based on the preferences identified and/or based on the intuition of the loan officer.

Figure 7:
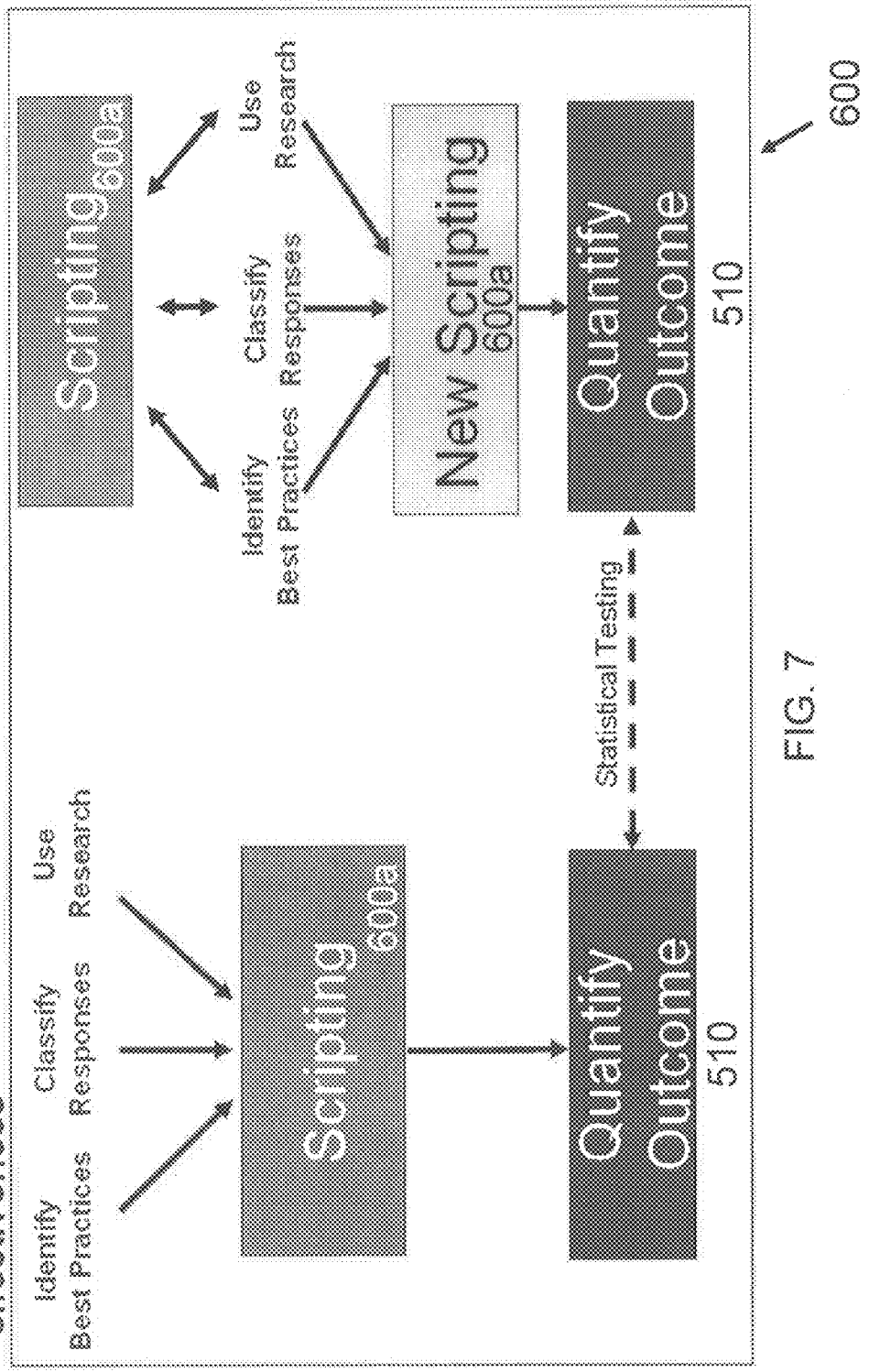
FIG. 7 gives an overview of an exemplary scripting design process in accordance with aspects of the present invention.

FIG. 7 gives an overview of an exemplary scripting design process 600 in accordance with aspects of the present invention. As shown in FIG. 7, the scripting process 600 may generally be iterative. That is, it is usually advantageous to generate scripts 600a via "script engines," to quantify the outcome of using those scripts 600b using Analytical Models 510 (FIG. 3C), and subsequently to modify the scripts 600a based on the outcome 600b. The "script engine" can be any system or method that produces scripts according to input conditions. For example, the "script engine," may be or include software run on a standard desktop computer. The process 600 is shown in particular in the right side of FIG. 7, as shown, in which the identification of the best practices, classification of responses and research are used from the results of one run of the script engine 600a as input for another run of a script engine 600a. In this way, script engines 600a may be modular and may be employed in various phases of the collection process. For example, scripts used in the early intervention phase 1b of the collection process may be used as input to a scripting engine 600a to generate scripts for later phases of the process, such as the home retention phase 1c. In addition to using scripts as input, the responses to scripted questions can be used as input.

The exemplary design process 600 shown in FIG. 7 is highly user-interactive. However, alternative script design processes can be implemented that are less user-interactive. The process 600 generally begins with the best collection practices input to the scripting engine 600a. These best practices can be industry agreed upon practices, they can be novel or experimental practices, practices shown to work specifically well in a particular area, etc. In addition, as shown in FIG. 7, research results may be typically input to the scripting engine 600a. These research results may be obtained from a variety of sources. For example, they may be the results of behavioral science research showing which traits or norms are applicable, advantageous, or adverse to certain lending practices and situations. They may include the results of market research, and be used to produce scripts that help loan officers identity factors in Borrowers that make them particularly good candidates for certain loan programs. The research results may further include, among others, results from previous successful and unsuccessful cases, Borrowers, and collection procedures. Such information can allow scripts to be created that help loan officers navigate through several optional collection procedures.

Another exemplary source of input for the scripting engines 600a, among others, is a classification of Borrower responses, as shown in FIG. 7. Various classification schemes are available and generally serve to navigate the loan officer through the collection procedure. For example, the Borrower may be classified in terms of the likelihood of default based on the responses. Other classification schemes that may be used in addition to or instead of such a classification scheme may include those schemes that rate whether or not a particular collection program would be advantageous for the Borrower. For example, the Borrower may be given a score based on his or her potential to successfully respond to all of the collection programs available to the loan officer. The classification of Borrower responses may be determined by the loan officer, or may be accomplished through the use of behavioral analysis or software. In addition, the classification may be performed by a psychologist, behavioral specialist, or other professional. The Borrower's responses may be classified on a rolling basis (e.g., throughout the course of the conversation with the loan officer), or may be evaluated based on responses in previous conversations with the loan officer or other entities (e.g., human resource departments, consultation or other interviews, psychologists, financial consultants), for example.

Once the scripts are generated by the scripting engine 600a, according to the input information, they are delivered to the loan officer by one of a number of methods. For example, the scripts may be reported to the screen of a terminal used by the loan officer so that the scripts may be selected or changed during the course of a conversation with a Borrower. The scripts may also be reported to the screens of a number of other devices (monitors, blackberry or handheld devices and/or cellular phones, for example) or otherwise determined (e.g., via sound). Generally, the scripts may be delivered to the loan officer in any manner that is advantageous. For example, it may be advantageous to have the script engine 600a print the scripts to hard copy on regular paper or cue cards.

Once the scripts have been generated by the scripting engine 600a and used by the loan officer, the results are ascertained and quantified 600b. Quantification of results 600b may proceed along one of number of lines, including using the techniques and practices associated with models identifying the optimal loan resolution (as described further below). Generally, scripts leading to favorable results (e.g., avoidance of foreclosure, more prompt payment) are compared against those that lead to less favorable results. The details of the scripts may be compared to determine which elements are critical to the successful outcome, followed by an elimination of other elements. Alternatively, scripts leading to relatively unsuccessful outcomes may simply be eliminated from the scripting engine without further analysis.

As shown in FIG. 7, statistical analysis may be used in the quantification of outcome 600b both to determine the success rate and the usefulness of each script or each element of a particular script. This statistical analysis may include the use of a variety of statistical methods and techniques, including scoring based on outcome, various types of regression analysis (linear and non-linear), least-squares analysis, structural equation-based modeling, Monte Carlo analysis, genetic methodologies, artificial neural networks, partial least squares, the use of a variety of statistical methods and techniques, including scoring based on outcome, various types of regression analysis (linear and non-linear), least-squares analysis, etc. A number of other types of statistical analysis may be also be used, depending on the availability, need, and computational resources involved. As mentioned above, the statistical analysis may be applied to each element of a given script to determine the element's value. For example, a particular portion of a scripted conversation, in which the loan officer provides either social proof or incentives (as shown, for example, in FIG. 6) to the Borrower, may be evaluated against the overall outcome in collection cycles to which it has been applied. Such an evaluation generally may include comparing results obtained when the script element is present to results obtained either when the element is omitted altogether or when another element is substituted for the element being evaluated. Once the element has been scored or evaluated, it may be either eliminated from the script or retained, depending on the result. Statistical analysis may be performed not simply on elements of scripts, but on entire scripts. Scripts may then be either eliminated from the scripting engine 600a or retained, based on the results.

Identifying the Optimal Loan Resolution

The Optimization Loan Resolution Model 700 can, among other things, identify the optimal resolution of a delinquent loan from a variety of options. This model has the additional potential advantages of standardizing the response to a particular collection cycle and/or tailoring responses, depending on the Borrower's specific needs, for example. The Model 700 may include a combination of several different types of models. Such models may include, but are not limited to: cash flow models 701, time series models, statistical models and optimization methodologies that work in tandem to generate optimal resolution for a Borrower. The optimal resolution may then be communicated to the borrower through the scripting engine (described above), for example.

One of the purposes of the optimization loan resolution model 700 is to avoid foreclosure by determining the most advantageous modification to the current collection plan. Modifications may be accomplished in one or more of a number of different ways, including by reducing interest over the entire term, reducing principal, and/or reducing interest temporarily over the short-term.

In contrast with the collector effectiveness-based scripting approach (above), the optimal resolution model 700 may take a macro-approach to decreasing variability. The optimal resolution model 700 finds optimal solutions in a range of debtor and loan variables. Specifically, this approach is in contrast to the collector effectiveness model 550 approach of placing more emphasis on the interaction of collector and debtor during specific instances of collections conversation. Of course, it is possible to use each model independently in order to reduce variability. However, it may be even more powerful in some implementations to use the models in conjunction with one another. Since each model uses a different approach for the problem of variability, using them in tandem can yield advantageous, synergistic effects.

In essence, a set of statistical models assesses the likelihood of the Borrower's actions (e.g., defaulting, staying current or even making a prepayment) during the collections cycle 1. These probabilities are then used to calculate "weighted expected cash flows," e.g., cash flows that are weighted by the probability associated with the Borrower taking a particular option. Options may be compared by comparing the "weighted expected cash flows" associated with the various options, for example.

Figure 8A:
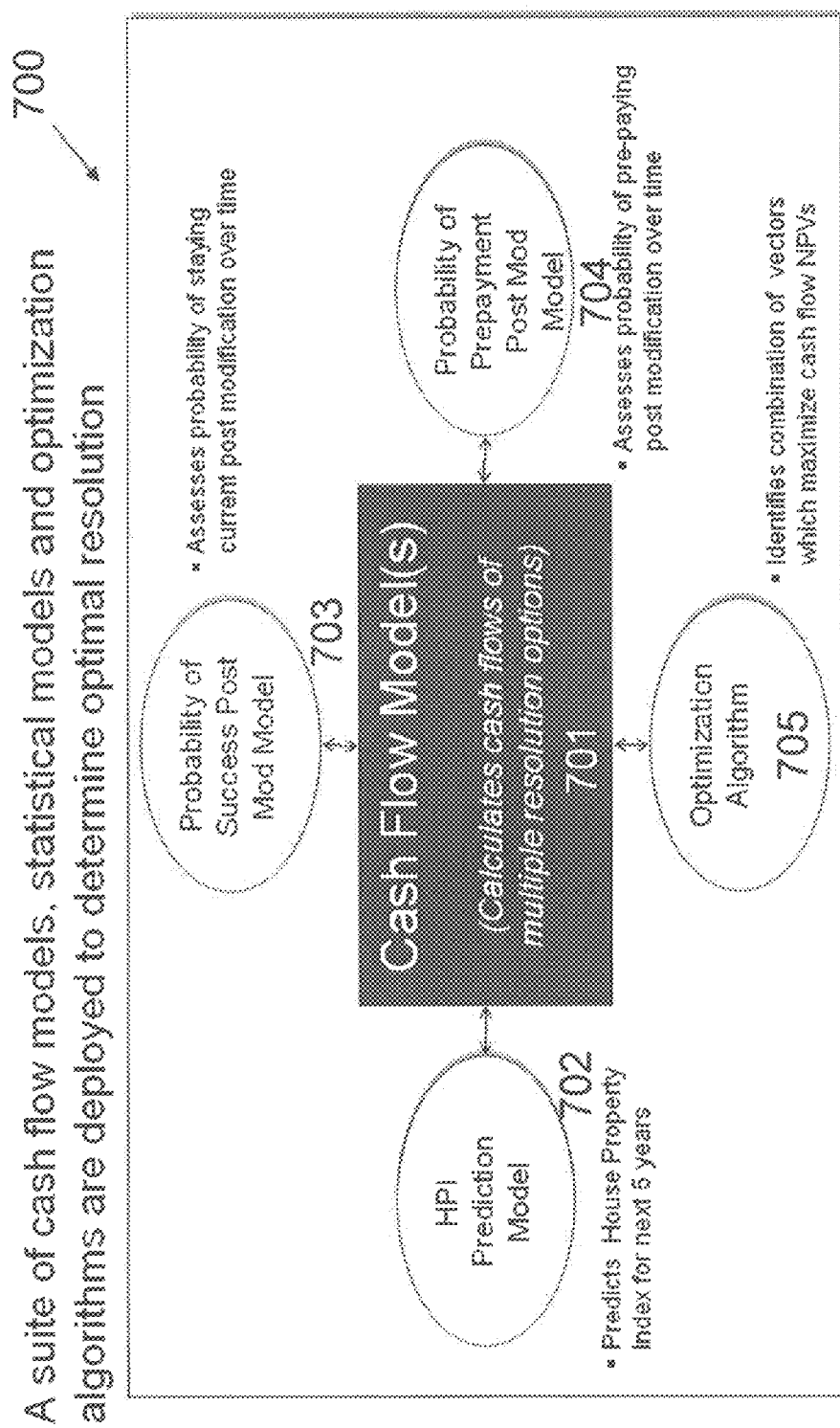
FIG. 8A presents an overview of procedures that may be employed, in accordance with aspects of the invention, in order to optimize loan resolutions.

FIG. 8A presents an overview of procedures that may be employed, in accordance with aspects of the invention, to optimize loan resolutions. FIG. 8B presents an exemplary list of cash outflows that may be part of the cash flow analysis 701 of the model 700 depicted in FIG. 8A. FIG. 8C presents an exemplary list of cash inflows that may be part of the cash flow analysis 701 depicted in FIG. 8A. It is to be appreciated that neither list in FIG. 8B or FIG. 8C is meant to be an exhaustive list. Rather, the lists in FIGS. 8B and 8C are merely representative of the types of variables that can be included in the cash flow analysis 701 of the model 700. Further, it is also not necessary for each of the items in FIGS. 8B and 8C to be part of the cash flow analysis 701 for every resolution option.

One of the goals of this operation is to select the best collection program, from among an array of possible programs, for each Borrower. Programs may vary in their application of one or more of a number of "vectors," or variable elements of the collections cycle. These variable elements generally may include options available to the lender, collector, or lending agency that may change the terms and conditions of the collections cycle in a way that may bias the cycle towards favorable resolution (e.g., towards avoiding default or foreclosure). Such variable elements may include, but are not limited to, changing the interest rate during collections, reducing the principal, delaying payments, and/or proposing alternative payment schedules. Ideally, the best combination of the variable elements is selected in the optimization process 700 so that this combination may be applied to particular candidates in order to improve collection cycle results and to reduce overall variability in the cycles.

FIG. 8A gives a general overview of an integrated modeling approach 700 that includes a suite of models interacting with one another to create an overall model or process 700. FIG. 8A is not meant to be an exhaustive representation of the model 700 and, in fact, adding additional models to the model 700 or removing one or more of those models 702-705 represented in FIG. 8A is to be understood to be within the context of some variations of the invention. Using the models 702-705 in FIG. 8A in conjunction, one can evaluate most of the possible outcomes that are feasible for a particular Borrower during a particular collection cycle and then determine the best, Borrower-specific solution. In so doing, the methods and systems for an integrated approach may calculate: the cash flow for each realistic option (where "option" refers to a change or modification in the specifics of the lending process), the net present value (NPV) of each loan, and/or other quantifications of the loan process.

In order to accomplish the optimization, various information (e.g., information relating to the Borrower, the borrowing environment, and the financial environment, as shown in FIG. 8A) is input to a "cash flow model" 701. The cash flow model 701 generates a prediction or predictions of the cash flow resulting from each of a number of possible options and may compare the results according to each of the collection cycle options. Although in one variation, the cash flow model 701 compares outcomes specifically by comparing the net cash flows generated by each option, other variations are also possible. The cash flow model 701 is not restricted to calculating merely the cash flow that results from a particular option. Rather, the cash flow model 701 may also generate predictions of other results that may accompany application of a particular option (e.g., Borrower satisfaction, changes in the likelihood of default in future collection cycles due to the application of the option). Still other variables or results of interest may be added to the cash flow model, including home occupancy rates for a given area, maximizing improvement in the credit history of Borrowers, etc.

As shown in FIG. 8A, in one variation, the cash flow model 701 calculates the cash flow for each possible combination of variables. The calculation may generally proceed as follows. The Net Present Value (NPV) is calculated for each loan resolution option. This calculation is accomplished by first calculating the net cash flows and subtracting from this value the loan's coupon rate. The calculation of the cash flows is accomplished by using multiple models, along with weighting functions that estimate the probably of non-payment and weight the cash flow for a particular option, accordingly. The models, their results, and the weighting functions are discussed further below.

In the example shown in FIG. 8A, several sources of information are provided to the cash flow model 701. These sources may include the inputs from the suite of models 702-705. One objective of the model in FIG. 8A is to calculate the Net Present Value (NPV) for each possible resolution so that the results can be compared and an optimal result can be determined.

Optimization routines that can be used in and in conjunction with the cash flow model 701 and any other appropriate model described herein include each of as well as combinations of the following: structural equation-based modeling, Monte Carlo analysis, genetic methodologies, artificial neural networks, partial least squares, a variety of statistical methods and techniques, including scoring based on outcome, various types of regression analysis (linear and non-linear), least-squares analysis, etc. A number of other types of statistical analysis may be also be used, depending on the availability, need, and computational resources involved.

A Housing Price Index (HPI) prediction model 702, which values the price trajectory for the home serving as collateral for the loan, may be used to calculate the likely liquidated value of the property at any given time and can be generally used to predict that value over the course of the collections cycle and/or over extended periods of multiple years.

One HPI model 702 enables assessment of future property value in the cash flow models. Time series modeling along with econometric regression techniques may be used to make Case Shiller (CS) HPI monthly forecasts for 5 years, for example. There are two stages to the exemplary prediction of HPI shown below: 1) prediction of Case Shiller Home Price Index (CS HPI) for 20 MSAs for the next five years; and 2) mapping of 20 Case Shiller HPI predictions onto the remaining 343 US MSAs through 6-dimensional clustering. This approach may be taken because Case Shiller values were not available for those 343 MSAs to enable their independent prediction. Those MSAs thus need to be "clustered" around 20 MSAs for which CS prediction is possible.

The output of HPI model 702 may be used to determine expected property value at any point in time in future, given its current value, for example. The future value is adjusted by same factor as the change in HPI value for the respective MSA to which the property belongs, in a corresponding time period. This approach enables property sale proceeds assessment in the future, which may be an important element of cash inflows expected in the future, in some variations of the present invention.

Further, a detailed zip to MSA mapping may be performed in the model. When working on a loan, for example as soon as zip information is captured, it may be automatically mapped to MSA, which then maps to the "cluster" to which the MSA belongs so as to thereby pick up the predicted HPI values for assessing property liquidation value in the future.

Probability of Success Post Mod Model 703 may include a model that assesses the probability that the Borrower will stay current on payments after a proposed modification to the collection process is made. This model is used to quantify differences in possible outcomes so that the cash flow model 701 may be employed in a quantitative assessment of various options at any given time. It may be used to calculate the probability of success of a particular payment, a series of payments, or an average payment over a set period of time, for example. Inputs to this model may include prior behavior of the Borrower (e.g., credit or default history), as well as elements that measure the personality traits of the Borrower. Additional elements and metrics may also be included.

Probability of Prepayment Post Mod Model 704 may include a model that assesses the probability that the Borrower will make payments in advanced of the specified deadline after a proposed modification to the collection process is made. This model may be used to quantify differences in possible outcomes so that the cash flow model 701 may be employed in a quantitative assessment of various options at any given time, for example. It may be used to calculate the probability of prepayment of a particular payment, a series of payments, or the average probability of prepayment over a set period of time. Inputs to this model may include prior behavior of the Borrower (e.g., credit or default history), as well as elements that measure the personality traits of the Borrower. Additional elements and metrics may also be included.

Optimization Algorithm 705 may include a model that identifies an optimal combination of elements or variables (e.g., changes in interest rates or other modifications of the collections cycle). This element may be used to quantify differences in possible outcomes so that the cash flow model 701 may be employed in a quantitative assessment of various options at any given time. It may be used to calculate the probability of prepayment of a particular payment, a series of payments, or the average probability of prepayment over a set period of time, for example. Inputs to this model may include prior behavior of the Borrower (e.g., credit or default history), as well as elements that measure the personality traits of the Borrower. Additional elements and metrics may also be included.

Figure 9A:
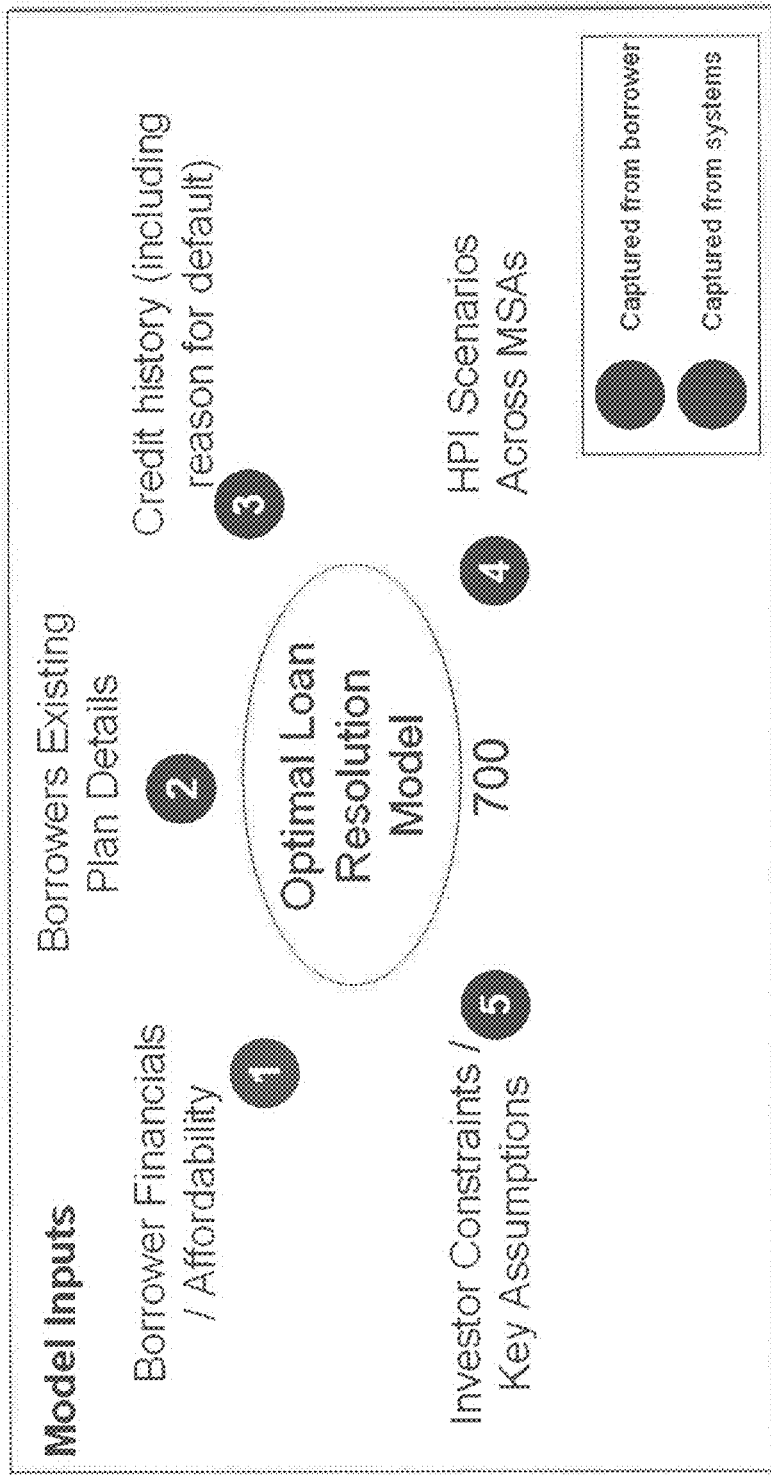
FIG. 9A shows exemplary inputs to the model that may include information captured from the Borrower, as well as information from other sources, in accordance with aspects of the present invention.

As shown in FIG. 9A, inputs to the model may include information captured from the Borrower, as well as information from other sources. Exemplary inputs and sources also appear in FIG. 9B. One example of information from "other sources" is information culled from data mining or from modeling of various relevant parameters, including HPI Scenarios. Of the model inputs that may be captured from the Borrower, examples include: 1) an assessment of the Borrower's current financial status (which also may be obtained from other sources); and 2) the credit history of the Borrower (including reason for previous defaults). If the Borrower is not forthcoming with this information, it may be obtained from other sources, such as credit history databases, human resources databases or other sources. Several inputs may be obtained from "systems" or methodologies. These may include: 1) details of the existing payment plan, which may be captured from the databases of the lender; 2) the various HPI scenarios which may or may not include various factors specific with metropolitan service areas (MSAs); and 3) investor constraints, assumptions or limitations placed on the lending process by the lender. It is to be understood that this list of inputs in not exhaustive and may encompass additional data or additional data types as needed. Examples of possible data types may include data from a behavioral analysis of the Borrower, data characterizing the overall credit environment in a given area, and data relating to the work history of the Borrower, etc.

Figure 10A:
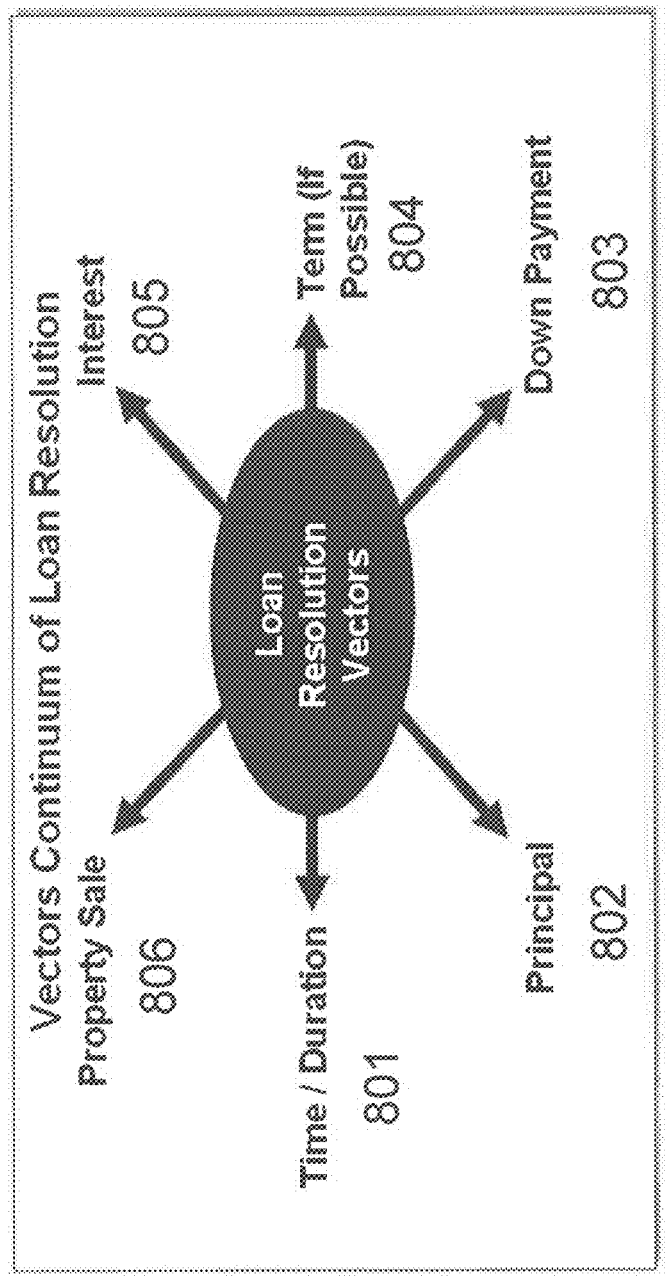
FIG. 10A gives an exemplary overview of "vectors" or variables that may be considered in the optimization process, in accordance with aspects of the present invention.

FIG. 10 provides an exemplary overview of "vectors" or variables that may be considered in the optimization process. For example, the vectors that may be altered in an attempt by the optimization routine to find an optimal solution or collection program may include, but are not limited, to the those in FIG. 10B. FIG. 10B gives an exemplary list of modifications for the variables of FIG. 10A that may be considered in the optimization process.

Time/Duration of the Collection Process

Elements of the timing 801 of the collection process that may be varied or altered include the payment schedule, the entire collection cycle, and/or the time of year of particular payments.

Principal

The principal 802 may also be altered during payment processes. For example, if default appears imminent, a reduction in principal may be preferable to default. The principal 802 can be changed in response to changes in the status of the Borrower, general economic conditions or other extrinsic or intrinsic variables or considerations.

Down Payment

The timing and amount of the Borrower's down payment 803 may be tailored to the advantage of the Borrower or lender. For example, if the Borrower appears especially likely to default, a larger down payment 803 may be required. If the collateral (usually a home or other property) is especially valuable and the Borrower's credit history does not indicate excessive risk of default, the down payment 803 may be minimized. A broad spectrum of changes to the down payment 803 is also possible for cases that fall within these extremes.

Term

If the term 804 can be altered, this may be advantageous both for the purposes of collection and for the overall economic health of the Borrower.

Interest

Multiple changes to the interest 805 may be possible. If the interest 805 is charged as a flat rate, that rate may be altered (e.g., decreased) in order to provide the Borrower with relief, if default appears to be imminent or likely. Short-term changes in the interest rates may also be possible in order to facilitate payment. Correspondingly, a calculation may be made of the optimal time to end a short-term interest 805 decrease in order to obtain an optimal solution.

Property Sale

It may be important to calculate an estimation of the potential profit obtained from the sale of the property 806 used as collateral for the loan or mortgage. This sale 806, being the last resort in the case of foreclosure, is one benchmark by which other modifications to the lending program may be measured. In other words, any modification that is likely to produce less cash flow than sale 806 of the property may not be a particularly favorable option. There may be instances in which other considerations, however, may be paramount, and these considerations may need to be evaluated with respect to this option.

Optimization methodologies 705 that can be used in the Optimization Loan Resolution Model 700 include each of, as well as combinations of, the following: structural equation-based modeling, Monte Carlo analysis, genetic methodologies, artificial neural networks, partial least squares, the use of a variety of statistical methods and techniques, including scoring based on outcome, various types of regression analysis (linear and non-linear), least-squares analysis, etc. A number of other types of statistical analysis may be also be used, depending on the availability, need, and computational resources involved.

Figure 11A:
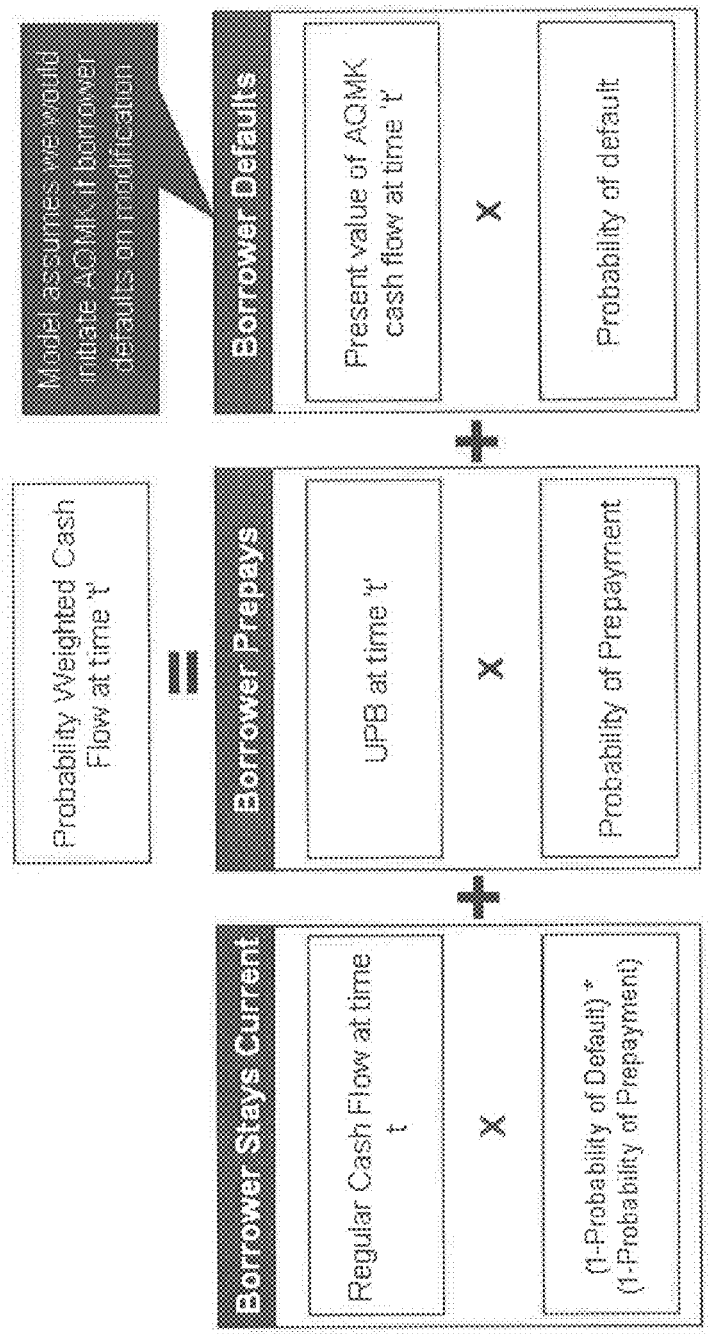
FIG. 11A shows an exemplary weighting function for the cash flows calculated by the model, in accordance with aspects of the present invention.

FIG. 11A shows an exemplary weighting function for cash flows calculated by the model. In general, cash flows may be weighted according to the probability of three possible outcomes: e.g., 1) the probability that the Borrower stays current on the payments; 2) the probability that the Borrower prepays all Unpaid Principal Balance (UPB) on the debt; and 3) and the probability the Borrower will stop making payments altogether (i.e., the Borrower defaults). This list is not meant to be exhaustive, and other possibilities, including those of late or inadequate payments, etc. may also be included in the model. It should be noted, as indicated in FIG. 11A, that in the case of Borrower default, the usual model assumption may be that foreclosure procedures must be initiated. However, it is possible to modify this assumption so that alternative procedures (including a system of penalties, etc.) may be contemplated by the model. If foreclosure is initiated, the model may calculate the value of Acquiring and Marketing the asset (AQMK). The probability weighted cash flow at any given time is calculated by the summation, as indicated in FIG. 11A. This summation requires a calculation of the probability of both Default and Prepayment discussed below.

A number of probably models can be used to assess the probability of Default and Prepayment. As an example, the probability models may include $1^{st}$ and $2^{nd}$ lien prepayment models in conjunction with $1^{st}$ and $2^{nd}$ lien default models. The definitions relating to default conditions may be entirely variable and depend on the conditions set by the loan officer. Prepayment is usually defined as paying the entire UPB in one current month, but alternative payment schemes may also be included. As mentioned above, for illustrative purposes, it may be assumed that default proceedings automatically commence in the model after one month's default.

FIG. 11B shows exemplary variables used to make probability predictions for the probability cash flow calculation shown in FIG. 11A. It is to be appreciated that the list in FIG. 11B is not meant to be an exhaustive list. Rather, the list in FIG. 11B is merely representative of the types of variables that can be included in probability predictions. Further, it is also not necessary for each of the items in FIG. 11B to be part of the probability predictions for every resolution option.

Figure 12:
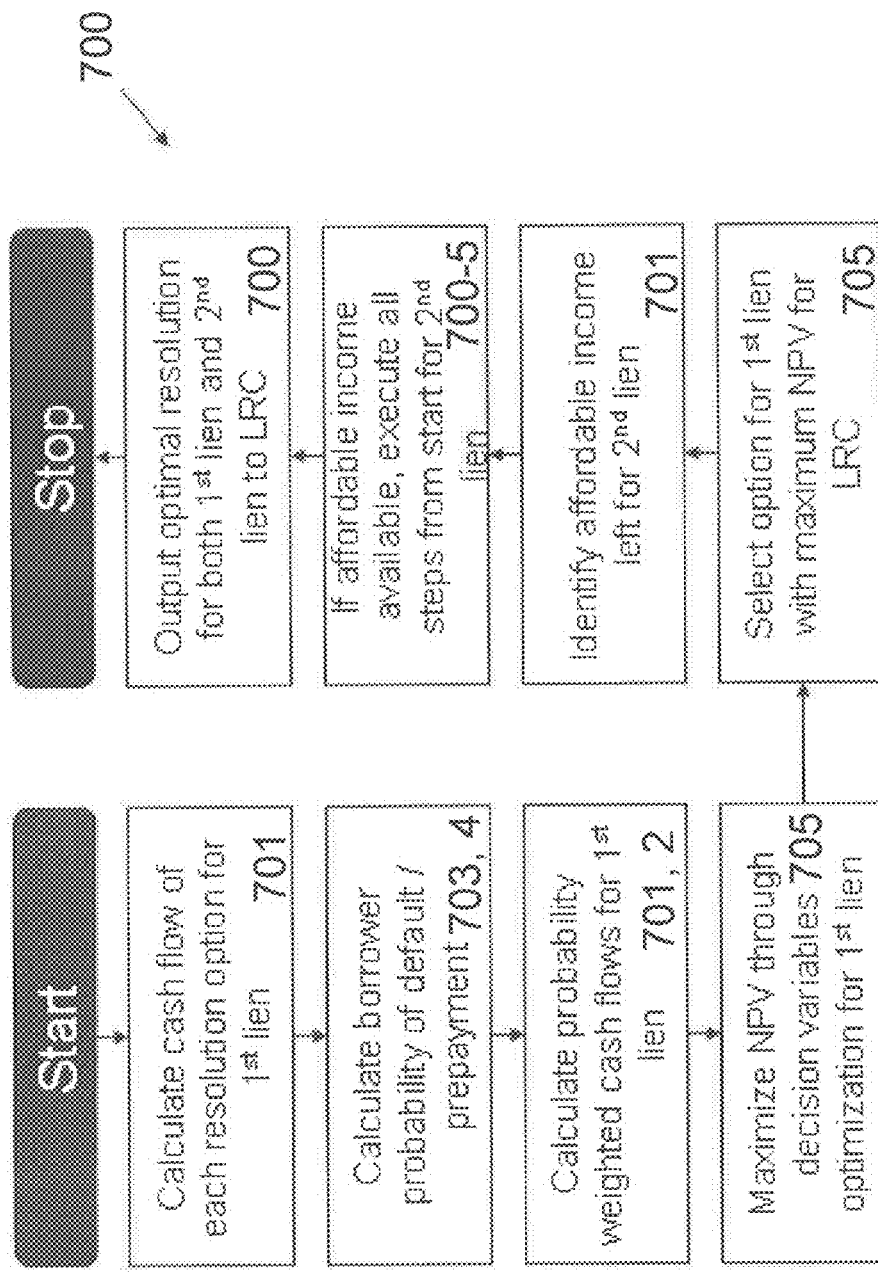
FIG. 12 shows one exemplary iteration of the Optimal Loan Resolution Model that occurs after the Borrower's data (according to FIGS. 9A and 9B) has been entered, in accordance with aspects of the present invention.

FIG. 12 shows one exemplary iteration of the Optimal Loan Resolution Model 700 that occurs after the Borrower's data (according to FIGS. 9A and 9B) has been entered. As mentioned above, one objective may be to identify a resolution option where Net Present Value (NPV) of expected cash flow is maximized. FIG. 12 shows the model iterating through a first and second lien. Note that, in FIG. 12, each step not explicitly performed by a model 701-705 is assigned to the overall model 700. As shown in FIG. 12, the cash flow model 701 initially calculates the cash flow for each resolution of the first lien. Subsequently, the probability models 703 and 704 calculate the probabilities that the Borrower will default, prepay, or meet the payments. This information is then used to weight the cash flows for all options for the first lien by the cash flow and HPI prediction models (701 and 702). The optimization algorithm 705 then determines the set of variables that result in the maximized NPV, based on the weighted probability cash flows. Next, the optimization algorithm 705 selects the best option, or the one that maximizes the NPV. Next the cash flow model 701 identifies the affordable income for a second lien. If the cash flow model 701 finds favorable conditions for a second lien, the above steps are completed for the second lien. The results are then reported by the model 700.

It is to be appreciated that the above description of a model run is merely exemplary. In certain situations, it may be advantageous to run the model in a substantially different sequence. Such variations are within the scope of variations of the present invention. Further, it may also be possible to omit or add a step to the exemplary iteration shown in FIG. 12, within the scope of aspects of the present invention. In fact, it may be expected that the model can be used for multiple iterations and/or for different, perhaps specialized loan calculations, that would deviate from the exemplary iteration shown in FIG. 12.

Implementation and User Interface

Figure 13B:
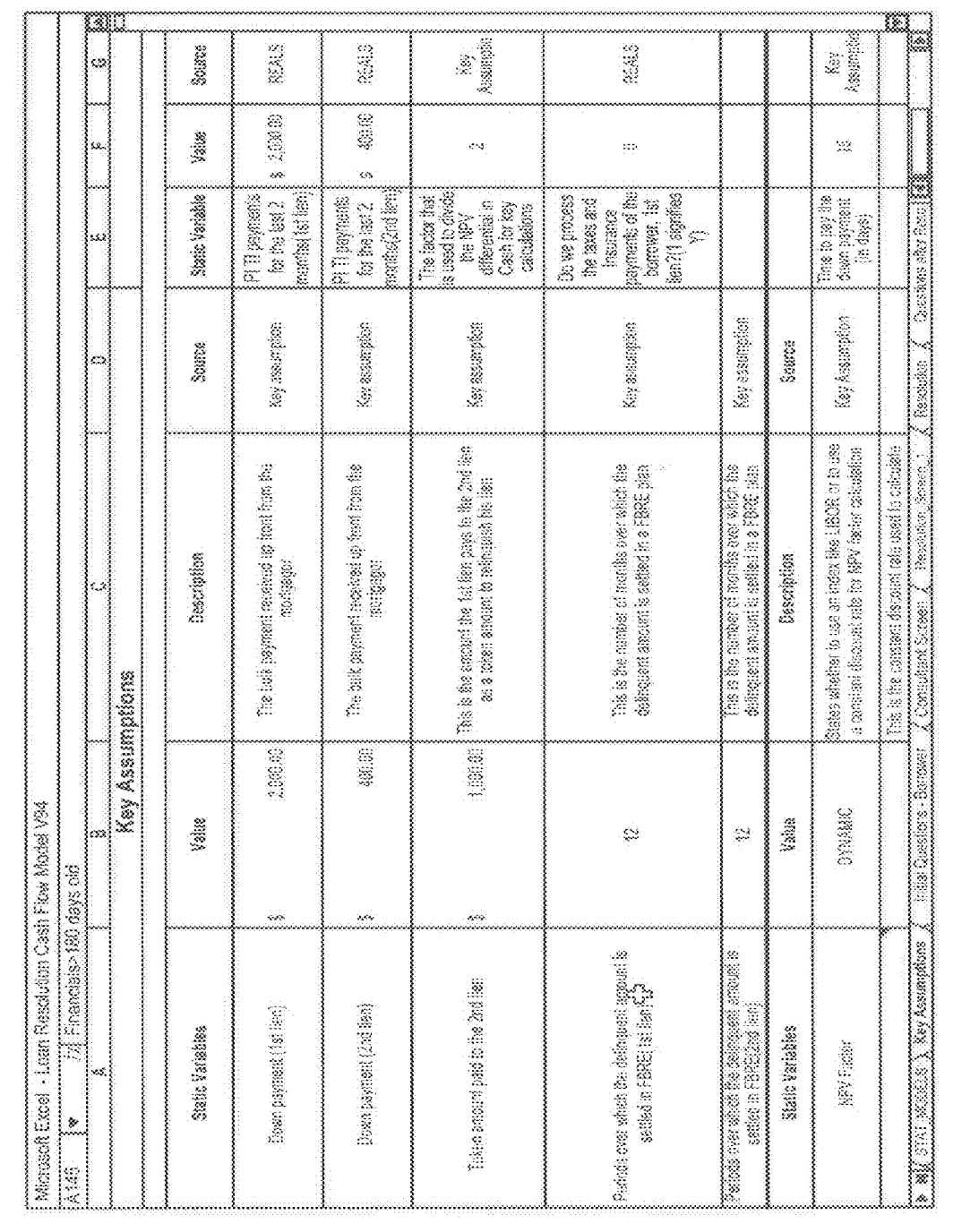
Figure 13G:
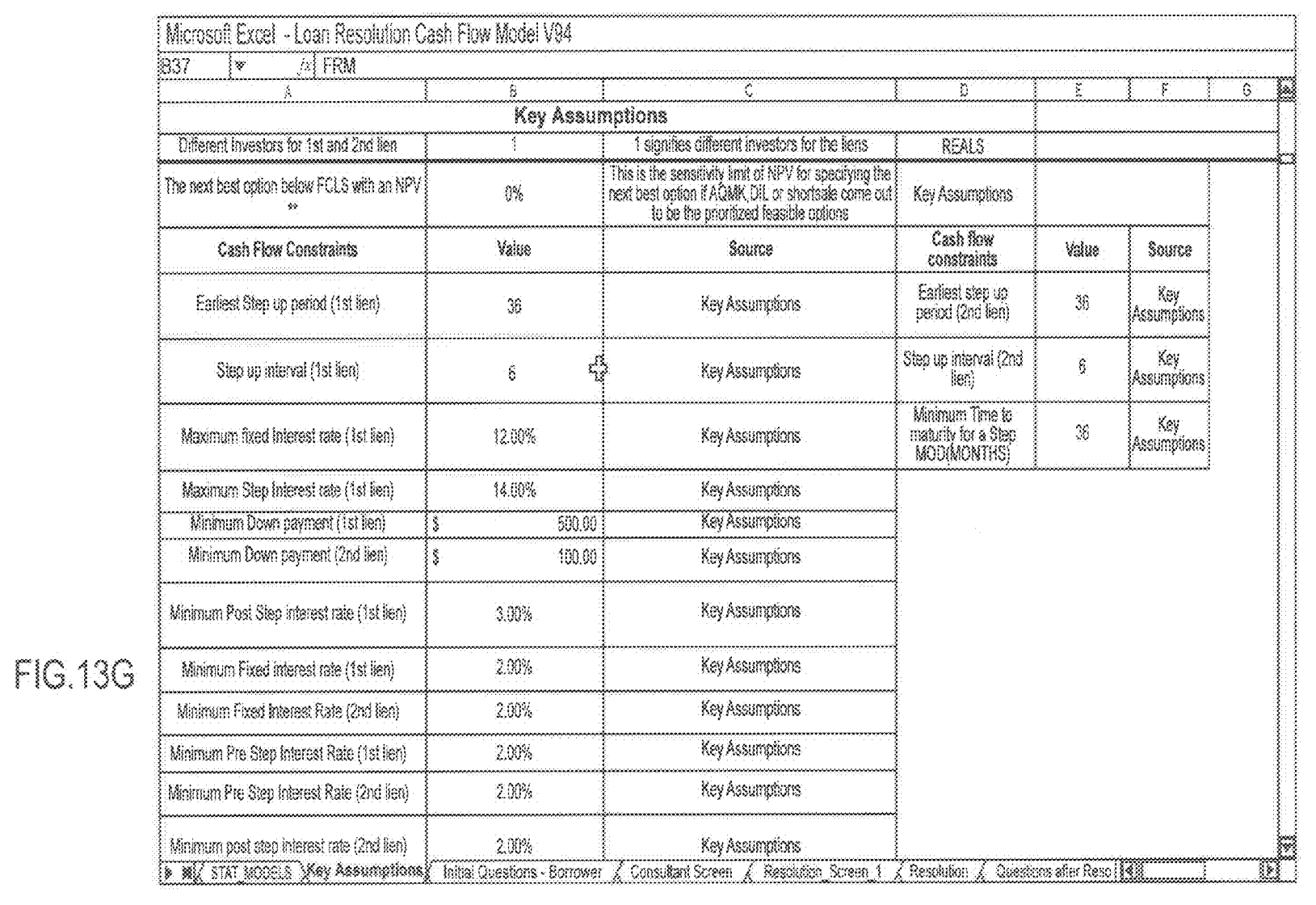
Figure 13H:
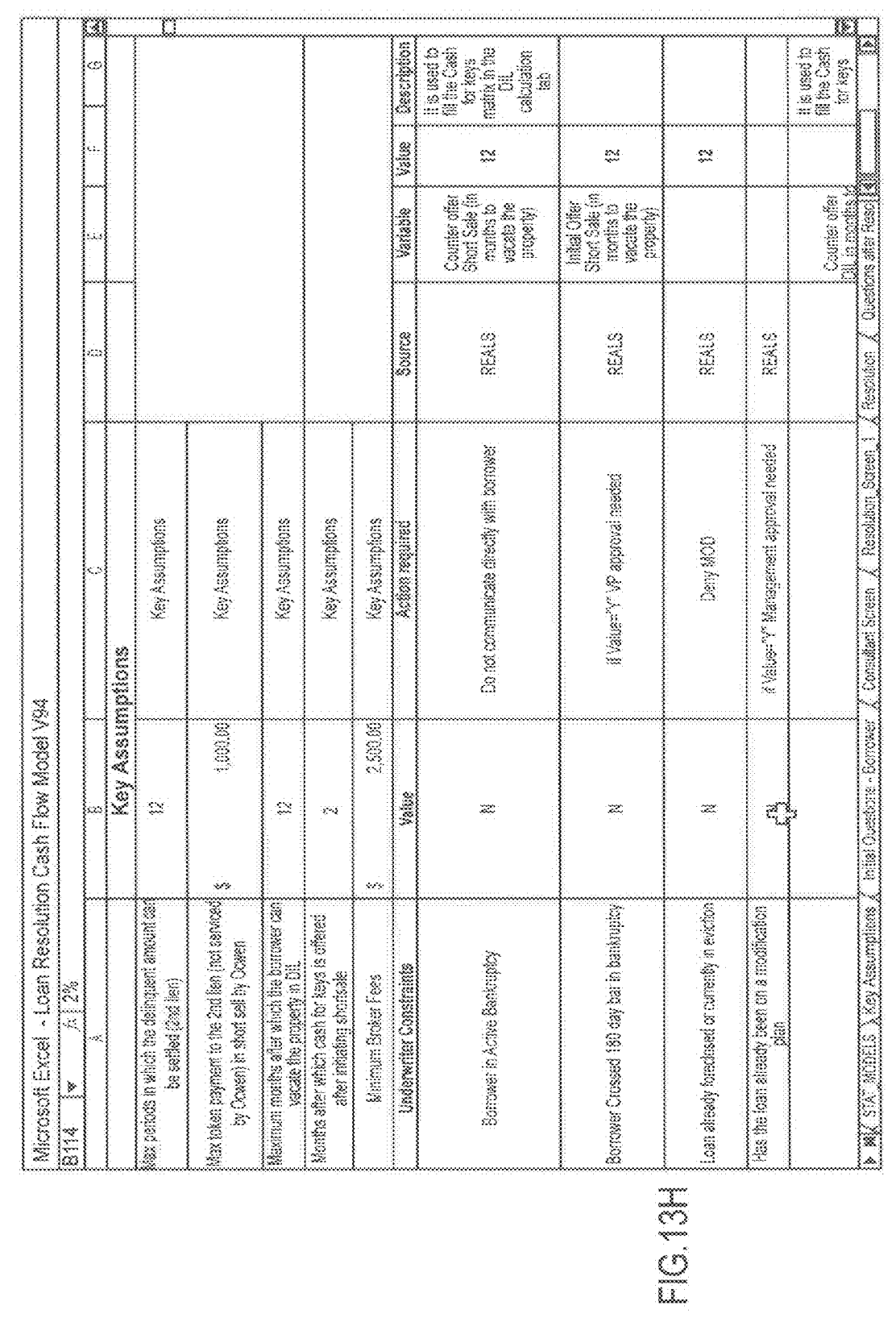
Figure 13J:
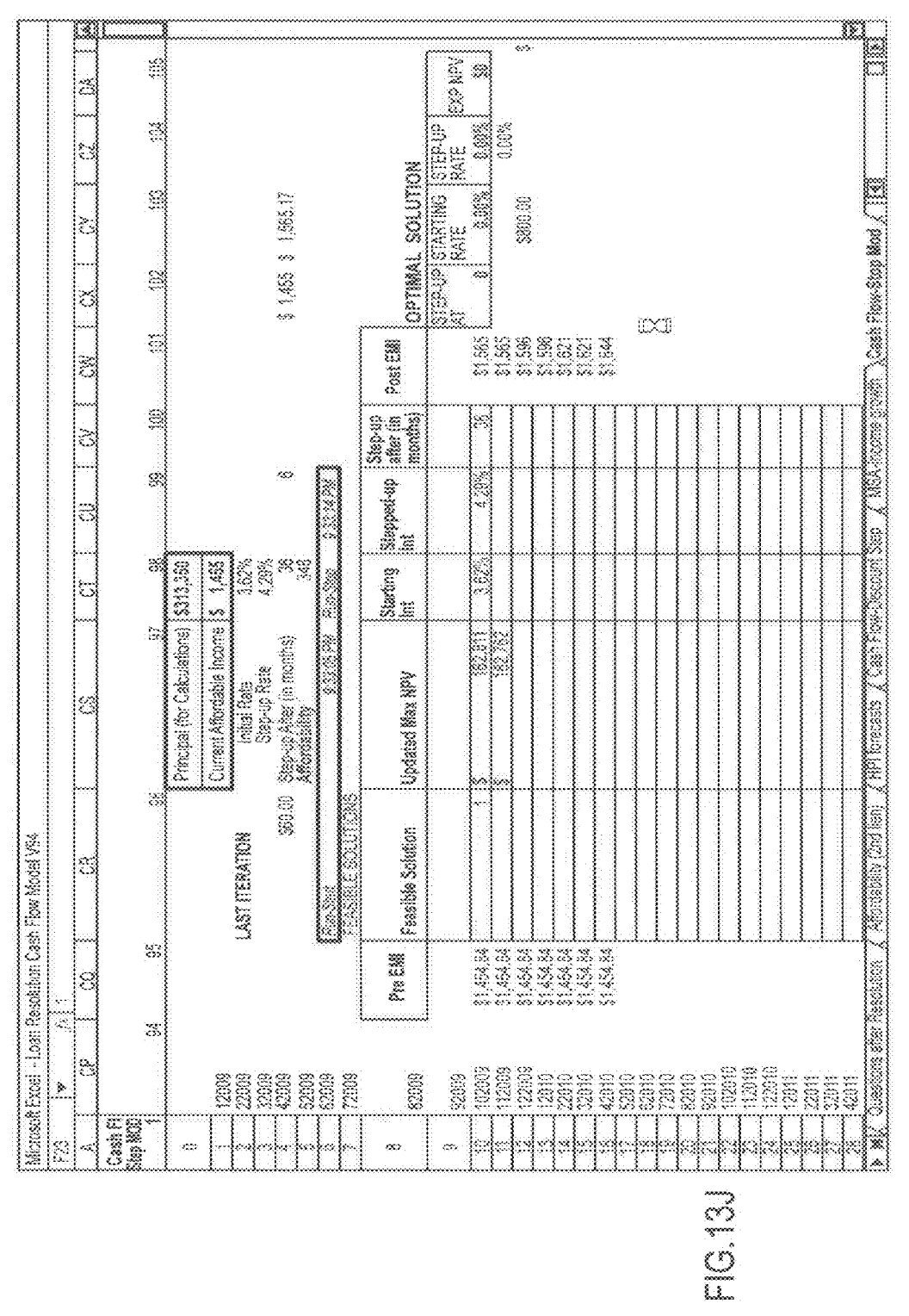
Figure 13L:
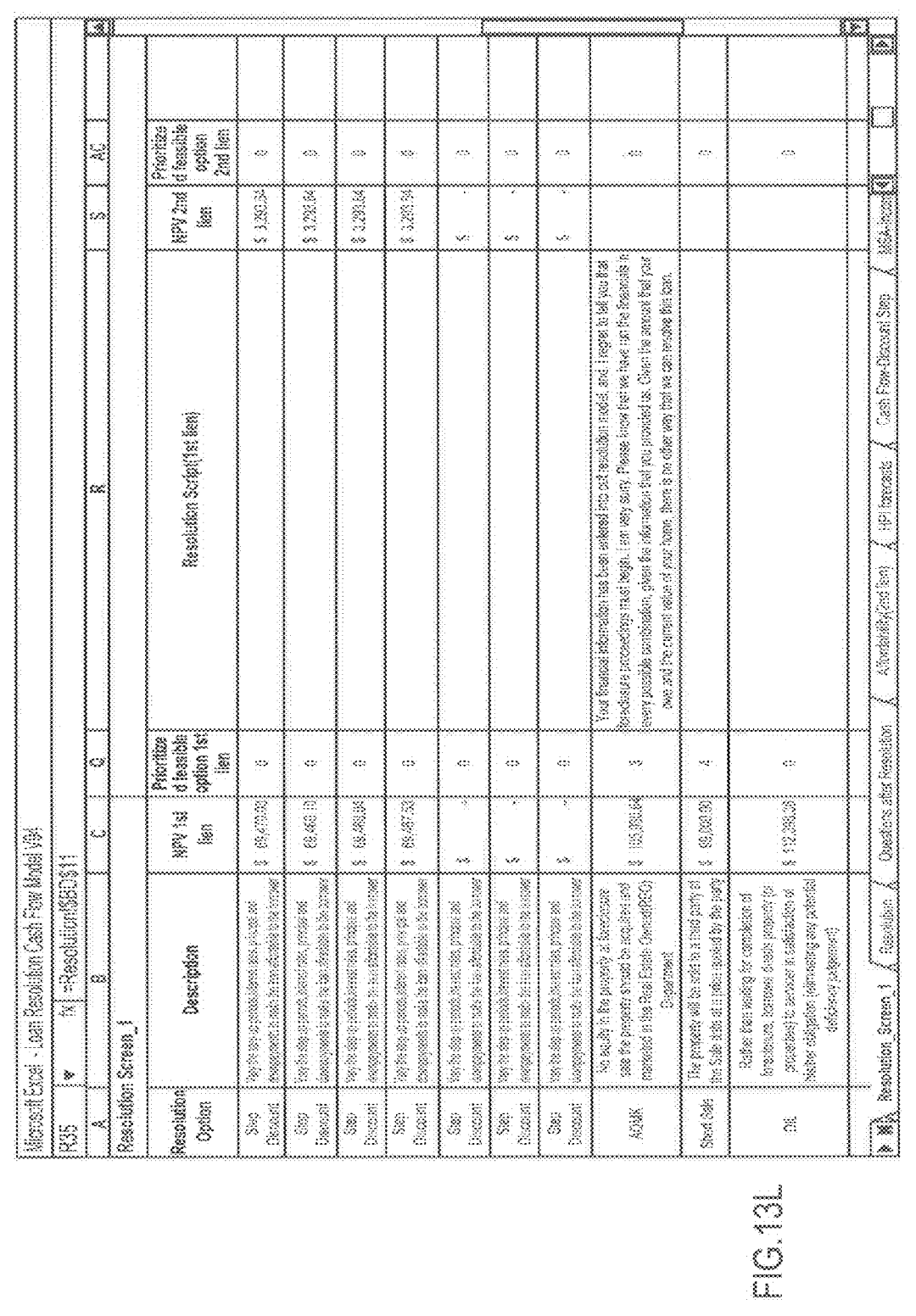
Figure 13P:
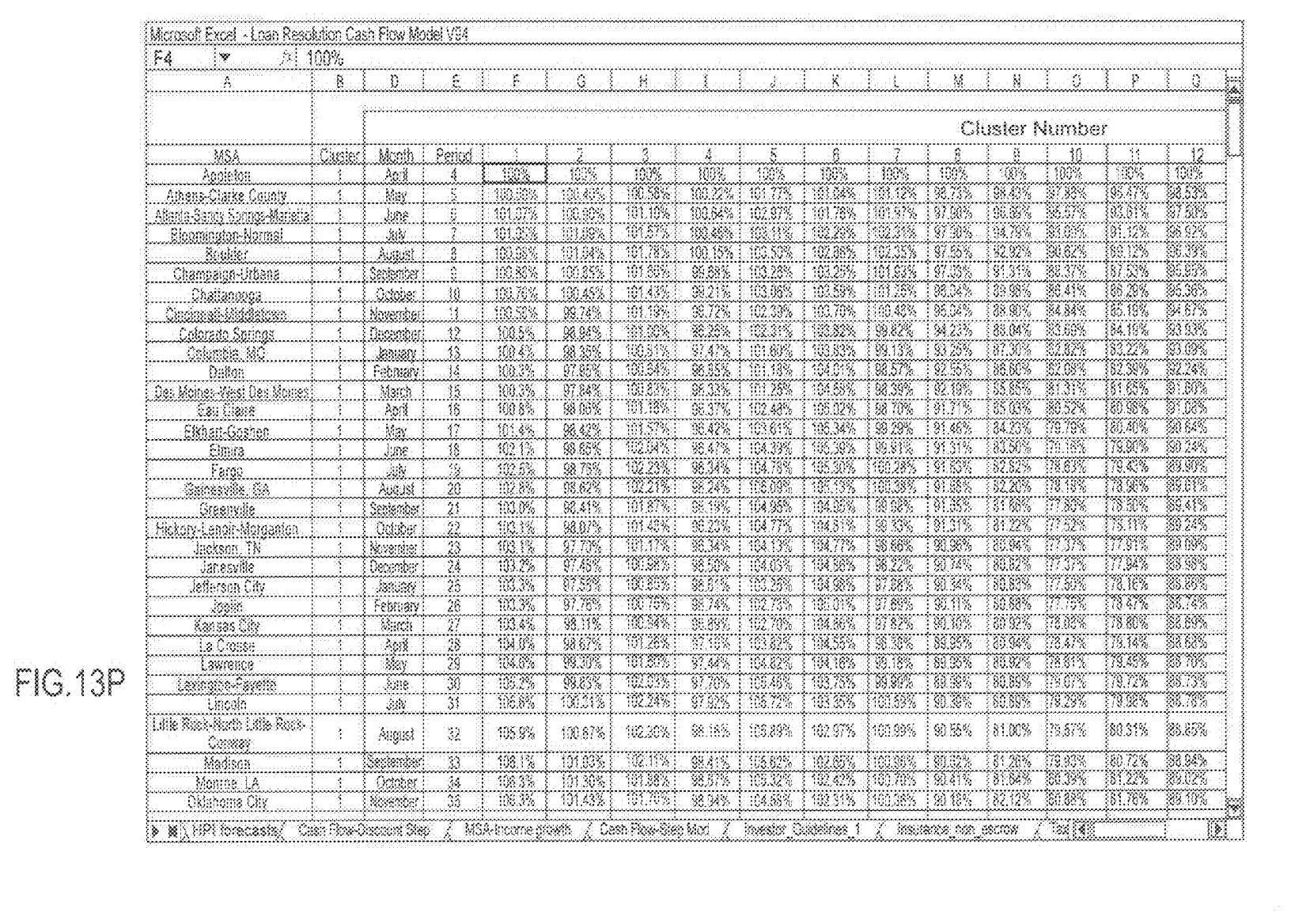

FIGS. 13A-13P provides an illustration of one run of exemplary methods and systems described herein using a Microsoft® Excel platform. This illustration is meant to provide an exemplary implementation of the methods and systems on a particular platform. However, it is to be understood that the methods and systems discussed herein can be implemented in a number of different ways, including on multiple platforms.

For example, the scripting questions, optimization routines and methodologies can be implemented using Microsoft® Excel via coding in Visual Basic, as shown in FIGS. 13A-13P. In this way, the scripting and data entry aspects to the program are accomplished through a Microsoft® Excel interface, and the optimization aspects of the program run in the background. A number of alternative arrangements are also possible. For example, the methods and systems can be implemented as part of free-standing windows-based applications with displays, data entry and computation completely or partially separate from any other application, The methods and systems may also be coded on a platform that runs separately or in parallel with Windows or another operating system (e.g., MS DOS), for example, may be configured to be accessed remotely through a terminal interface, or may be configured in another manner. Software applications other than Microsoft® Excel may be used to implement the methods and systems. For example, the methods and systems may be implemented using one of a number of programmable data analysis applications, including Sigma Plot, Igor and others. The methods and systems may also be implemented using other types of applications, such as MS Word and/or other more user friendly and familiar applications. Still other implementations of the methods and systems are possible. For example, the methods and systems may be coded in any number of executable computer languages to be run on any number of platforms. Examples of other platforms include Linux, Mac OS, etc.

The user interface may be entirely graphical, as shown in FIGS. 13A-13P, or it may be audible (e.g., where certain elements of data entry are recorded from the loan officer's speech via voice recognition and/or results are transmitted through the use of a voice simulator). Illustrations, animations, and audio, for example, may be employed to interact with the user in a number of different ways.

The methods and systems may be configured to be interactive, as shown in FIGS. 13A-13P. Versions of the methods and systems may be configured to require or permit less user interaction (e.g., data may be entered through the transmission of a compilation in file format, rather than entered on a keyboard in real-time). Still other versions of the methods and systems may permit the user to alter aspects of the program that may not be clearly shown to be alterable in FIGS. 13A-13P. For example, some versions may allow the user to specify the details of the optimization and the optimization routine used (e.g., Monte Carlo, gradient methods, genetic algorithm(s)).

Example variations and implementations of methodologies, measurements, processes and programs in accordance with aspects of the present invention have now been described in accordance with the above advantages. It will be appreciated that these examples are merely illustrative. Many variations and modifications will be apparent to those skilled in the art.

In places where the description above refers to particular implementations of methodologies, measurements, processes and programs for optimizing the collection cycle, it should be readily apparent that a number of modifications may be made without departing from the spirit thereof and that these aspects and implementations may be applied to other methodologies, measurements, processes and programs for optimizing the collection cycle. The presently disclosed aspects and implementations are therefore to be considered in all respects as illustrative and not restrictive.

What is claimed is:

1. A method for optimizing at least one collections loan cycle between a lender and at least one borrower using at least one processor and memory coupled to the processor, the lender having a plurality of collections officers, the method comprising:
measuring, via the at least one processor, personality traits of the plurality of collections officers;
selecting, via the at least one processor, a collections officer to communicate to the at least one borrower from the plurality of collections officers, wherein the selection is based on the personality traits of the collections officer; and
determining, via the at least one processor, an optimal resolution of the at least one collections loan cycle for the at least one borrower to be communicated by the collections officer to the at least one borrower;
delivering, via the at least one processor, a communication of the optima resolution to the collections officer; and
identifying a persuasiveness measure of the communication of optimal resolution between the collections officer and the at least one borrower;
wherein a quantifiable variability of the at least one collections cycle is minimized through optimization of at least the selection of the collections officer, determination of the optimal resolution, and identification of the persuasiveness measure of the communication.

2. The method of claim 1, further comprising:
generating an estimate of the effectiveness of each collections officer in the plurality of collections officers based on categorized personality traits.

3. The method of claim 2, wherein the categories include at least one category selected from a group consisting of a behavioral category, a cognitive category, a personality category and a demographic category.

4. The method of claim 1, further comprising generating a script for the selected collections officer to communicate the optimal resolution of the at least one collections loan cycle to the at least one borrower.

5. The method of claim 4, wherein the script is generated based on borrower behavioral information.

6. The method of claim 4, wherein the script further comprises optional conversation branches.

7. The method of claim 4, further comprising:
determining the effectiveness of the generated script based on statistical analysis.

8. The method of claim 1, wherein determining the optimal resolution further comprises:
modifying a collections plan for the at least one borrower.

9. The method of claim 8, wherein the collections plan for the at least one borrower is modified using at least one factor selected from a group consisting of interest rate, loan principal, delay of payment and alternative payment plan.

10. The method of claim 1, wherein the optimal resolution is determined using a cash flow model, and wherein using the cash flow model comprises:
comparing cash flows generated by at least two options; and
generating a prediction based on the comparison.

11. A system for optimizing at least one collections loan cycle between a lender and at least one borrower, the lender having at least one collections officer, the system comprising:
at least one processor;
a first module operatively coupled to the at least one processor, the first module for measuring personality traits of the at least one collections officer;
a second module operatively coupled to the at least one processor, the second module for selecting from the at least one collections officer a selected collections officer to communicate to the at least one borrower, the selection being based on at least one personality trait of the selected collections officer;
a third module operatively coupled to the at least one processor, the third module for generating a script for the selected collections officer to use in communicating with the at least one borrower;
a fourth module operatively coupled to the at least one processor, the fourth module for determining an optimal resolution of the at least one collections loan cycle, wherein the fourth module comprises a module for delivering a communication of the optimal resolution to the selected collections officer and a module for determining the persuasiveness of the generated script and the effectiveness of the selected collections officer based on statistical analysis; and
a fifth module operatively coupled to the at least one processor, the fifth module for quantifying the variability of the at least one collections cycle wherein the variability is minimized through optimization of at least the optimal resolution, the persuasiveness of the generated scrip and the effectiveness of the collection officer.

12. The system of claim 11, wherein the first module further comprises:
a module for categorizing the personality traits into two or more categories; and
a module for generating an estimate of the effectiveness of the at least one collections officer based on the categorized personality traits.

13. The system of claim 11, wherein the third module comprises a scripting engine.

14. The system of claim 11, wherein the generated script further comprises optional conversation branches.

15. The system of claim 13, further comprising:
a module for inputting best collections practices into the scripting engine.

16. The system of claim 11, wherein the optimal resolution of the at least one collections loan cycle comprises a collections plan for the at least one borrower, the collections plan using at least one factor selected from a group consisting of interest rate, loan principal, delay of payment and alternative payment plan.

17. The system of claim 11, wherein the optimal resolution of the at least one collections loan cycle is identified via a cash flow model.

18. The system of claim 11, further comprising:
a module for comparing cash flows generated by at least two options; and
a module for generating a prediction based on the comparison.

19. A computer program product comprising a non-transitory computer usable medium having executable control logic stored therein for causing a computer having at least one processor to optimize at least one collections loan cycle between a lender and at least one borrower, the lender having a collections officer, the executable control logic comprising:

computer readable program code means for optimizing, via the at least one processor, an effectiveness of the collections officer by measuring personality traits of the collections officer and selecting the collections officer from a plurality of collections officers based on the personality traits of the selected collections officer;

computer readable program code means for generating, via the at least one processor, a script for use by the selected collections officer in communicating with the at least one borrower, the generated script being generated based on statistical analysis of the persuasiveness of the script; and computer readable program code means for determining, via the at least one processor, an optimal resolution of the at least one collections loan cycle to be communicated by the selected collections officer to the at least one borrower via the generated script;

wherein a quantifiable variability of the at least one collections loan cycle is minimized through optimization of at least the personality traits, the optimal resolution, and the persuasiveness of the script.

20. The method of claim 1, further comprising determining the communication of the optimal resolution according to behavioral information of the at least one borrower gathered in the at least one collections loan cycle.

\* \* \* \* \*